United States Patent [19]

Mueller et al.

[11] Patent Number: 5,323,322

[45] Date of Patent: Jun. 21, 1994

[54] NETWORKED DIFFERENTIAL GPS SYSTEM

[75] Inventors: K. Tysen Mueller, Cupertino; Peter V. W. Loomis, Sunnyvale; Rudolph M. Kalafus, Los Gatos; Leonid Sheynblat, Redwood City, all of Calif.

[73] Assignee: Trimble Navigation Limited, Sunnyvale, Calif.

[21] Appl. No.: 846,380

[22] Filed: Mar. 5, 1992

[51] Int. Cl.[5] .............................................. G01S 5/02
[52] U.S. Cl. .................................. 364/449; 364/459; 342/357; 342/358
[58] Field of Search ....................... 364/449, 452, 459; 342/357, 358, 463

[56] References Cited

U.S. PATENT DOCUMENTS

| | | | |
|---|---|---|---|
| 4,646,096 | 2/1987 | Brown | 342/357 |
| 4,751,512 | 6/1988 | Longaker | 342/357 |
| 4,797,677 | 1/1989 | MacDoran et al. | 342/352 |
| 5,155,490 | 10/1992 | Spradley, Jr. et al. | 342/357 |
| 5,202,829 | 4/1993 | Geier | 364/449 |
| 5,225,842 | 7/1993 | Brown et al. | 342/357 |

OTHER PUBLICATIONS

Alison Brown, "Extended Differential GPS," published by *Navigation: Journal of the Institute of Navigation*, in vol. 36, No. 3, Fall 1989, pp. 265–285.

*Primary Examiner*—Thomas G. Black
*Assistant Examiner*—Michael Zanelli
*Attorney, Agent, or Firm*—Thomas E. Schatzel

[57] ABSTRACT

An embodiment of the present invention relates to a worldwide network of differential GPS reference stations (NDGPS) that continually track the entire GPS satellite constellation and provide interpolations of reference station corrections tailored for particular user locations between the reference stations Each reference station takes real-time ionospheric measurements with codeless cross-correlating dual-frequency carrier GPS receivers and computes real-time orbit ephemerides independently. An absolute pseudorange correction (PRC) is defined for each satellite as a function of a particular user's location. A map of the function is constructed, with "iso-PRC" contours. The network measures the PRCs at a few points, so-called reference stations and constructs an iso-PRC map for each satellite. Corrections are interpolated for each user's site on a subscription basis. The data bandwidths are kept to a minimum by transmitting information that cannot be obtained directly by the user and by updating information by classes and according to how quickly each class of data goes stale given the realities of the GPS system. Sub-decimeter-level kinematic accuracy over a given area is accomplished by establishing a mini-fiducial network.

35 Claims, 6 Drawing Sheets

Fig._1

| 1 2 3 4 5 6 7 8 9 10 12 13 14 16 17 18 19 20 21 22 23 24 | 25 26 27 28 29 30 | |
|---|---|---|
| (header word one) | parity | — 152 |
| (header word two) | parity | — 154 |
| fill | sat. ID | pLat, meters / radian | parity | — 156 |
| issue of data | pLon, meters / radian | parity | — 158 |
| fill | sat. ID | pLat, meters / radian | parity | — 160 |
| issue of data | pLon, meters / radian | parity | — 162 |
| fill | sat. ID | pLat, meters / radian | parity | — 164 |
| issue of data | pLon, meters / radian | parity | — 166 |

Fig. 8

NETWORKED DIFFERENTIAL GPS SYSTEM

This invention was made with Government support under contract NAS9-18360 awarded by NASA. The Government has certain rights in this invention.

BACKGROUND OF THE INVENTION

1. Field of the Invention

The invention relates generally to the global positioning system (GPS) and specifically to methods and devices that allow a user to reduce GPS navigation errors.

2. Description of the Prior Art

The global positioning system (GPS) is a United States funded satellite system consisting of sixteen to twenty-four satellites in a constellation that beams highly accurate timed signals to earth. GPS receivers can process these signals from anywhere in the world and provide a user with position information that can be accurate to within twenty meters. Each GPS satellite moves through a known orbit and the time that individual GPS satellite transmissions take to reach a user's position are used in solving a triangulation problem. The individual signal paths from each satellite to the user's position must pass through the troposphere and ionosphere. Position solution errors can occur when there is not accurately accounted for radio signal propagation delays caused by the troposphere and ionosphere. The ionosphere introduces its maximum delays about 2:00 PM local time and has practically no effect at night. Thus, the local time may be important to a position solution. The troposphere can introduce delays that are a function of barometric pressure, temperature, humidity and other weather variables. Variations in the actual orbit of each GPS satellite can also have an impact on position solution accuracy. Drifts in the clock of each GPS satellite will also impact user position solution accuracy. Service bureaus and agencies have been established to sell or otherwise provide differential data. Such data range from real-time local information to sometimes very complex mathematical models based on long-term observations. US Government agencies issue orbit correction information on a satellite-by-satellite basis.

Dual frequency carrier GPS receivers continuously track P-code L1 and L2 carriers of a GPS satellite to generate accumulated delta-range measurements (ADR) and at the same time track L1 C/A-code to generate code phase measurements. Each carrier is modulated with codes that leave the GPS satellite at the same clock time. Since the ionosphere produces different delays for radio carriers passing through it having different radio frequencies, dual carrier receivers can be used to obtain real-time measurements of ionospheric delays at a user's particular position. (L1 is typically 1575.42 MHz and L2 is typically 1227.6 MHz.) The L1 and L2 ADR measurements are combined to generate a new L1 ADR measurement that has an ionospheric delay of the same sign as the ionospheric delay in the L1 pseudorange. Accurate ionospheric delay figures, if used in a position solution, can help produce much better position solutions. Without such real-time ionospheric delay measurements, mathematical models or measurements taken by third parties (which can be old) must be used instead. The communication of this information to a user's site can be costly and require wide communications channel bandwidths.

Commercial and private users have been able to make use of GPS satellite transmissions even though they use so-called "unauthorized" receivers. "Authorized" receivers are able to receive special information (P-code) that can remarkably improve position solution accuracy. Since an enemy could use GPS to fly and target missiles and artillery shells to better than one meter of accuracy, the United States Department of Defense occasionally engages a selective availability (SA) mode, spoofing and encryption of the GPS signals that deliberately introduce solution errors into user receivers that lack an authorization code needed to see through the masking. A "codeless" unauthorized GPS receiver is able to cross-correlate the L1 and L2 signals and extract enough information to measure the ionospheric delay (although not enough to overcome SA or to read P-code encrypted by Y-code to secure transmissions.)

With differential GPS, a stationary reference receiver is placed at a very accurately known point location. The reference receiver generates corrections which are sent to a transmitter, which in turn broadcasts the corrections to users within the area of the transmission broadcast. A differential GPS user receives these corrections through a radio/modem and applies them to the direct GPS measurements. This gives the user a position measurement of very high accuracy, e.g., from one meter to ten meters.

However, as a user's receiver is moved away from a reference receiver, the corrected accuracy will gradually deteriorate. Thus, the region of usefulness is finite. By employing a network of reference stations, the accuracy achievable by users near a reference station can be had throughout a region of several hundred miles.

While advantages of differential GPS networks have been well known, the basic problems to realization of them are many. A means of reducing the communications volume between the reference stations is needed in order to keep the cost of service down and thus to be competitive. A means of reducing the communications volume between the reference station and the user population is needed. Also needed are effective techniques and algorithms that enable a minimum number of reference stations to be employed. Effective techniques and algorithms are needed that provide high accuracy throughout a large operating region, for example, worldwide in a band of latitudes that include most of the populated areas.

A paper written by Alison Brown, titled "Extended Differential GPS," published by *Navigation: Journal of the Institute of Navigation*, in Vol. 36, No. 3, Fall 1989, pp. 265-285, presents an extended differential GPS concept that uses a network of differential GPS stations. A differential GPS message can be computed that provides corrections for the different components of the pseudorange error. This is reported to extend differential GPS navigation accuracy to one thousand nautical miles from a master differential station.

NETWORKED DIFFERENTIAL GPS

GPS navigation error results from a variety of sources. In general, the worst error contributors are common, virtually constant and exist over large areas. Included are satellite orbit and satellite clock errors (especially that due to the intentional degradation of selective availability), ionospheric error and to a lesser extent, tropospheric error. Differential GPS (DGPS) is a prior art method of eliminating such errors. It works by measuring the GPS signals with a receiver at a known location (a reference station). The actual position is compared to the position solution. A difference in the positions can be due to ionospheric delays, satellite clock bias and orbit ephemerides. The net difference of all these is broadcast via any of several means to a local group of GPS receivers for correction. Differential GPS works quite well to produce meter-level accurate navigation as far as 100 kilometers from the reference station. The 100 kilometers limit is roughly consistent with line-of-sight high frequency (HF) differential data links, which are convenient for the high data rates (e.g., 300 bits per second) desirable for differential GPS. Consequently, simple DGPS has always been satisfactory for a wide range of navigation and positioning applications. However, the accuracy degrades as the distance from the reference station increases in amounts that are unacceptable to various users. In addition, many of the larger GPS errors will vary significantly over just a few hundred kilometers. It has been estimated that the DGPS degradation rate is approximately one centimeter of accuracy per kilometer (km.) of distance from the reference station.

There are at least three situations in which a simple DGPS solution is not sufficient. First, if the purpose is to provide DGPS service over a large area, establishing differential reference stations every 200 kilometers is extremely inefficient in terms of hardware and data link frequency allocation. Second, it is sometimes impossible to place a differential reference station within 100 kilometers of a working location. For example, oil exploration operations in the Gulf of Mexico and the North Sea need high levels of DGPS accuracy far from shore where the reference stations can be positioned. Also, there are certain users, such as the hydrographic surveyors servicing shipping channel dredges, that require decimeter level accuracy over a few dozen kilometers. Such levels of accuracy cannot be met by DGPS alone.

An embodiment of the present invention, a networked DGPS (NDGPS) answers the above needs. NDGPS reference stations can be thousands of kilometers apart and still supply much better coverage and accuracy than DGPS stations spaced 200 kilometers apart. Long distance off-shore service is handled by encircling a work area with DGPS reference stations. Corrections are interpolated for each user's site on a subscription basis. The data bandwidths are kept to a minimum by transmitting information that cannot be obtained directly by the user and by updating information by classes and according to how quickly each class of data goes stale given the realities of the GPS system. To provide sub-decimeter-level kinematic accuracy over a given area, a mini-fiducial (fixed reference) network can be established.

GPS ERROR SOURCES AND SPATIAL DECORRELATION

In the present invention, an absolute pseudorange correction (PRC) is defined for each satellite as a function of a particular user's location. A map of this function is constructed, with "iso-PRC" contours much like isobar contours on a weather map. The object of the network is to measure the PRCs at a few points, so-called reference nodes and to construct an iso-PRC map for each satellite. Due to the temporal changes in the ionosphere and the continuous change in the orientation of the line-of-sight vector to the space vehicle (SV), this map must be frequently update.. The spacing between the reference nodes is kept as wide as possible, so that any inferences about the character of the PRC function can be taken into account. If, for example, the PRC function varied unpredictably over a hundred kilometers, the reference nodes would have to be closely spaced. Fortunately, in general, this is not the case.

The error sources unique to each GPS receiver are multipath, code noise and inter-channel bias (where applicable). These errors are uncorrelated between receivers. The other error sources are correlated to some degree. DGPS provides pseudorange corrections designed to exactly compensate these errors at the GPS reference stations. However, as the user gets farther away from the reference station, the corrections become less exact. For each error there is some mechanism that controls the spatial decorrelation effect with distance from the reference station. Table I summarizes some of the major error sources and their spatial and temporal variations. The temporal decorrelation determines the frequency at which the DGPS pseudorange corrections have to be updated. The spatially correlated GPS error are described herein. The spatial decorrelations determine the accuracy of DGPS correction that can be achieved.

Satellite Clock Error—GPS navigation is basically hyperbolic navigation and relies on measuring pseudo-ranges from four or more transmitters (on satellites) that have known (albeit dynamic) positions and synchronized signal transmission. Small errors in the signal synchronization do occur and are calibrated for and broadcast. Under selective availability mode, the synchronization between the satellites is purposely made to wander. This effect, called clock dither and all other satellite synchronization errors, are completely correlated among all receivers that are tracking that satellite. Thus, the DGPS correction error is independent of the distance between the reference station and the user.

TABLE I

| | Spatial and Temporal Decorrelation | |
|---|---|---|
| ERROR | SPATIAL DECORRELATION | TEMPORAL DECORRELATION |
| Ephemeris | Elevation & Azimuth Angle Dependent | Position, Velocity & Acceleration Error Dependent |
| SV Clock | None (Totally Correlated) | Clock Drift & SA Dither Rate & Acceleration Dependent |
| Ionospheric | Elevation Angle, Local (Sub-350 Kilometers Alt) Time & Geomagnetic Latitude Dependent (Klobuchar Model) | Local Time & Geomagnetic Latitude Dependent |
| Tropo | Elevation & Azimuth Angle Dependent (Locally) - Temperature, Pressure & Humidity Spatial Dependence Unknown | SV Motion Dependent- Temperature, Pressure & Humidity Dependence Unknown |
| Ref Clock | Total (No Correlation) | Clock Drift & Acceleration Dependent |
| Multipath | Total (No Correlation) | SV Motion Dependent |
| Ref Location | Total (No Correlation) | Total (No Correlation) |

Satellite Orbit Error—The orbits of the satellites are measured by U.S. Government agencies and broadcast subject to selective availability. The orbit parameters are purposefully misreported a small amount to cause a controlled navigation error for the user, the so-called epsilon error. These slightly incorrect orbit parameters will cause both the reference station and user to use an incorrect satellite transmitter position in their computations of a user position solution. Although the user and reference will have identical errors in computed satellite position, they will have slightly different errors in their respective computed ranges because of the differences in their respective viewing angles to the GPS satellite. As the separation distances between reference and user grow, so will the differences in viewing angles and the differences between the computed range errors. The navigation error caused by satellite position error is highly correlated between viewers and very linear in nature (e.g., the error is roughly proportional to the distance from the reference station).

Ionospheric Error—As the GPS signal travels through the ionosphere, it experiences a delay for which there must be compensation. This delay can either be measured with a receiver that is capable of dual frequency code measurement, or it can be modeled. For ionospheric model errors, the correlation distances mainly depend on the particular model being used. The ionospheric models that serve stand-alone navigation, such as the GPS broadcast models of Klobuchar, Bent and the most recent version of the International Reference Ionosphere, generally use monthly averages for prediction and are believed to help remove 50% to 80% of the ionospheric delay uncertainty. However, relying solely on ionospheric models can leave an error of one-third to one-half of the ionospheric delay.

The following general observations can be made about ionospheric models: all models predict quiet ionospheric conditions only, the mid-latitude trough which exhibits large horizontal gradients in electron density is not incorporated in these models, the models work well only for latitudes between ±20 degrees and ±60 degrees, and they are poor predictors for equatorial and high-latitude regions. Since these very regions can be the principal areas of operation for certain users, these users are disaffected by the models.

Tropospheric Error—The tropospheric delay in a GPS measurement is an unwanted delay in the code and carrier data which is introduced by the earth's troposphere, which extends from sea level to an altitude of approximately fifty kilometers. Since tropospheric delay is RF frequency independent, it can be modeled. The total delay consists of a dry and a wet component. The dry component, which accounts for about 90% of the total delay, can be reasonably well modeled without any meteorological data. The wet component, on the other hand, requires measurements of the local weather conditions along the lines-of-sight to the GPS satellites being tracked for maximum accuracy. The best models extrapolate surface weather measurements, such as pressure, temperature and humidity for the higher altitudes using standard atmospheric profiles. All tropospheric models are good above fifteen degree mask angles. Comparisons of tropospheric delay models relative to ray-trace tropospheric delay estimates show that global models can be used to predict tropospheric delay to accuracies of 10 cm to 20 cm for elevation angles between 10° and 20°. Direct surface refractometry is a second method for dealing with tropospheric delays. The delays are measured directly along the line-of-sight.

For navigation networks, with hundreds of kilometers between reference stations, tropospheric error is more or less uncorrelated and hence considered to be reference station unique. For small networks, especially mini-fiducials, tropospheric model error between the reference stations and the users may be correlated and the network solution can be used to help improve user accuracy by including this term in the correction mix.

Datum and Clock Error—By selecting the position coordinates of the network reference stations, a network can effectively establish its own datums. These datums are related to existing datums, such as WGS84. Survey errors in the reference station coordinates will cause a correlated error among network users. Generally, a DGPS user will be navigating in both position and time, using the reference station position and clock as an absolute reference. This is also true for NDGPS, except that the network clock and datum are used as the absolute reference.

Another source of error is the latency of corrections due to constraints in transmitting out the information in real-time. This is a very important consideration in choosing data links and designing information flow. It may or may not be correlated among the network participants, depending on the particular DGPS algorithm implementation in the user receiver.

SPATIAL DECORRELATION OF ORBIT ERROR

Nominal Orbit Errors—Using just a few dual-frequency reference stations and an extensive satellite orbit and clock dynamics model, U.S. DOD agencies has managed to predict orbit and clock so well that user range accuracy of one to three meters is common. Orbit position errors are decomposed into three directions defined by the orbit itself: radial, along-track and cross-track. Radial error is error in the orbital radius. Along-track error is error along the satellite velocity vector. Cross-track error is error orthogonal to the radial and along-track errors. Radial error will translate directly into stand-alone navigation error without a significant affect on differential operations. For every meter of error in the radial direction, there can be nearly a meter of range error for every GPS receiver. For users directly under a particular GPS satellite, there would be exactly a meter of range error. For GPS receivers that see the satellite on the horizon, about 0.97 meters of the error is observed due to viewing the radial error about 15° off-axis. Consequently, the radial orbit error of a satellite position is viewed almost identically by all users. It is about equal to typical satellite clock bias error. This will not be true for along-track and cross-track errors. A meter of along-track or cross-track error (which are equivalent for terrestrial navigation purposes) is viewed by users 75° to 90° off-axis. Thus, it will not have much effect on stand-alone position accuracy.

selective availability—U.S. DOD has reported that it will constrain the statistics of the horizontal error of a GPS-derived position to 100 meters 2 drms (roughly the 95th percentile). This means that for 5% of the time the size of the position error is unconstrained. Further constraints at higher quantile levels have been proposed, but there is currently no reasonable maximum limit in the size of GPS position error.

There are two independent error sources that contribute to SA error, clock dither and orbit epsilon. Clock dither allows unpredictable clock synchronization wander of a few tens of nanoseconds. Thus, a stationary receiver will find its GPS position wandering a few tens of meters over a couple of minutes. Almost all of the selective availability experienced to date seems to have been clock dither. Clock dither is uniformly seen by all the GPS receivers, so DGPS can correct for it as well as can NDGPS.

There are practical limits to epsilon and its spatial decorrelation. Assuming that clock dither and epsilon each contribute, there is about seventy meters of error at the 95th percentile level. In a simplest of assumptions, the orbit epsilon error is considered to be (statistically) equal in all directions. This can be validated by considering the geometry of the satellite position error and how it translates into a pseudorange error. Many meters of along-track and cross-track orbit error are applied before achieving the assumed limit of seventy meters for the epsilon contribution to a horizontal error in stand-alone navigation. However, different users will view this error from significantly different angles, thus leading to a good level of spatial decorrelation. On the other hand, a radial error will introduce very little spatial decorrelation. Thus, compared to clock dither, the radial error is actually an inefficient method of selective availability implementation.

A simple Monte Carlo simulation can illustrate the spatial decorrelation effects that are possible with epsilon. If Gaussian errors with a standard deviation of 190 meters are applied in both the cross-track and along track directions, with no error applied in the radial direction, a stand-alone horizontal navigation error of 71 meters two drms results, which is roughly the level desired. Spatial decorrelations are measured by computing the position error of a differentially corrected user one kilometer away from a reference station. For purposes of this example, the horizontal navigation error (after differential correction) is 1.3 cm two drms over a one kilometers baseline, or 13 ppm. The 95th percentile vertical error is 3.0 cm or thirty parts-per-million (ppm). At this level, epsilon becomes a significant error contributor in DGPS. For a separation distance of one hundred kilometers between a reference station and user, errors of 1.3 meters horizontal and three meters vertical 5% of the time can be expected if the broadcast orbit parameters with the above described epsilon are used in conjunction with NDGPS. Many survey operations use post-processing, which allows orbit relaxation techniques or a replacement of the epsilon-contaminated broadcast orbit parameters with precise orbit parameters obtained from some other source. Unfortunately, typical survey applications have a real-time need for accurate orbit parameters. High error levels are particularly disastrous for "instantaneous" carrier ambiguity resolution methods, which are subject to false-fix and no-fix situations at high error levels. This makes ephemerides broadcast by various providers virtually useless in such applications because the ephemerides are stale. Code-averaging methods of carrier ambiguity resolution usually do not depend on the ephemeris to resolve the carrier ambiguity, but are still subject to spatial decorrelation error.

Two choices exist for accurate orbit parameters in real-time surveys establish a mini-fiducial network, or estimate a set of orbit parameters, both can be practical solutions. The mini-fiducial network adds two more reference stations to an existing real-time survey setup and has the attendant equipment and data-link costs. Orbit parameter prediction requires a receiver tracking network and near real-time post-processing using extensive orbit models, so it is subject to error only in the unlikely event that the satellite moves during the prediction interval.

SPATIAL DECORRELATION OF IONOSPHERIC MODEL ERROR

A single-frequency receiver relies on an ionospheric model to remove ionospheric delay from each pseudorange. The actual delay depends on the density of ionosphere encountered by the signal in transit and can throw off position solution accuracy many meters, especially when the satellites being tracked are low on the horizon and cut through a maximum slice of the ionosphere. A dual-frequency receiver can effectively measure the delay making use of the second frequency. Dual-frequency receivers can be roughly categorized into three types: those that rely on knowledge of the P-code to measure the ionospheric delay; and those that do not measure the ionospheric delay at all, but rather track both carrier frequencies. Codeless (squaring) L2 channel receivers may have long time constants and can have a lag error under active ionospheric conditions. Inter channel (L1/L2 channel) bias calibration may be necessary and must be possible. Conversion of dual-frequency measurements into ionospheric delay is not perfect, especially for satellites near the horizon. In general, the signal strength of P-code receivers is much higher and they track the ionosphere much more accurately and reliably, especially in active ionospheric conditions.

With differential GPS, a measurement of the ionosphere is made in the vicinity of the user. Depending on whether the receiver at the reference node is a single or dual-frequency type, the measurement is implicit in the pseudorange or can be separated out. An absolute ionosphere model is not required. A model of ionospheric variation over the differential GPS coverage area can be enough.

Ionosphere error is subject to occasionally very nonlinear behavior, unlike range errors due to orbit parameter error, which are very linear over large distances. Various published results by expert researchers demonstrate that the range of ionospheric behavior in some measurements, such as those taken in Greenland, vary in decorrelation distance from 200 kilometers (under "disturbed" conditions to 1,000 kilometers (in the normal case). Long-distance spatial decorrelation studies by Klobuchar indicate correlation distances in thousands of kilometers, with apparent differences observed in the east-west (3,000 kilometers) and north-south (1,800 kilometers) axes. Over moderate distances of a few hundred kilometers, the differential ionospheric variation has been measured in one instance to be on the order of 0.53 mm of differential vertical ionospheric delay per kilometer of separation distance, under daytime conditions. Nighttime conditions are usually more subdued. Other daytime results of 2.8 mm differential ionospheric delay error per kilometer of separation distance have also been reported in the literature.

NETWORK ALGORITHMS

From an algorithm standpoint, there are two basic varieties of networks. The simple type is the common-view network. The more complex type is the wide-area network.

Common-View Network Algorithm Design—The common view network assumes that a differential GPS user will navigate using only satellites that are visible to all the reference stations. The network will not be very large if the user is to be allowed track satellites very near the horizon. A mini-fiducial network covering an area 200 kilometers wide is a typical application of a common-view network. The elevation angle of a satellite near the horizon varies by roughly two degrees over the network. Since a common-view network area is small, it can be assumed that the PRCs are basically a linear function over the area. Across an area of such size, the linearity assumptions are reasonable for a single-frequency ionospheric model. It may extend to tropospheric models as well. The assumption may be over extended in the case of very low elevation satellites.

The PRC applied by the common-view NDGPS user is a weighted average, or blend, of PRCs from the reference stations. The weighting coefficients for a weighted-average are determined solely by the relative geometry of the user and reference stations. The same weighting coefficients are used for all code and carrier data. If the user is located close to one of the reference stations the data from that node is more highly weighted. The weighting coefficients can either be determined analytically or statistically. In the latter case, a Gauss-Markov spatial decorrelation assumption is invoked. Three weighting coefficients: $a_1$, $a_2$ and $a_3$ are used for a three node network and are determined analytically by solving the three equations:

user latitude = $\Sigma(a_i)$ (node latitude)$_i$;

user longitude = $\Sigma(a_i)$ (node longitude); and $1 = \Sigma a_i$

It is good practice to include more than three reference stations in a network. Using a least-squares analysis techniques, the extra data is used for checking assumptions about linearity and to check for reference station failures. The extra stations can also provide protection against equipment failure.

In contrast to DGPS, which sends the PRC in a useful form to the user, the NDGPS user must compute its own blended PRC, because the weighting coefficients depend upon the user's position. There are a couple of different methods to provide the user with the information to do this. One method, referred to as a decentralized broadcast method, has each of the three reference stations transmit normal, high rate DGPS streams. The user then computes the weighting coefficients $a_1$, $a_2$ and $a_3$ according to a rough estimate of the position and blends the three reference station PRCs before applying them to the pseudorange measurements. (The user can blend PRCs from more than three stations using a least-squares technique.) This method may be retrofitted to existing DGPS installations, because all the network-specific algorithms can be computed in the user's GPS receiver. It is, however, very inefficient from the standpoint of frequency allocation, because three high-rate DGPS data streams are needed, which requires three times the communication bandwidth and so multiplies recurring operational costs.

A more efficient method used in embodiments of the present invention, is a centralized broadcast method that integrates a network by transmitting a single NDGPS data stream. The single stream is a normal DGPS data stream with the PRCs for some arbitrary location and the north and east gradients of the PRC functions, relative to the arbitrary location. The DGPS data stream carries high-frequency information, which comprises mostly clock dither data. Typically, the information is carried by each of the DGPS data streams, resulting in a considerable waste of bandwidth. The gradient terms, due to orbit error and ionospheric error, vary relatively slowly and need only be updated every few minutes. The extra information added requires only a very low bandwidth.

Two points need to be made about common-view systems that distinguish them from wide-area systems. First, a common-view system needs no synchronization between the reference node clocks. Whatever the individual reference clock errors are, they are averaged into pseudorange corrections to form a blended "network clock", using the same weights that are used to blend the PRCs. The NDGPS user clock error is relative to the blended clock, just as the DGPS user clock error is relative to the DGPS reference station clock. Second, because the area of coverage is relatively small, there is no need to try to separate the satellite clock error from the satellite radial error (or more exactly, line-of-sight error). Consequently, the satellite position is not fully determined by the common-view network.

In March of 1991, a series of tests were conducted by the inventors to evaluate the performance of a network of GPS reference stations as a source for differential corrections. These corrections were used in a navigation solution of a railroad utility vehicle. Four GPS reference stations surrounding a segment of the track were used in a Burlington Northern Railroad test on the Mesabi Iron Range in the northern Minnesota. The results obtained demonstrate that a DGPS network applied to a railroad environment can achieve the most stringent accuracy requirement, a resolution of parallel tracks a mere four meters apart.

WIDE AREA NETWORK DESIGN

Wide-area networks can be designed to be efficient in terms of the installed hardware and communications. They also provide a potential for complete observability of the separate spatially correlated DGPS error sources. Wide-area networks typically span a much greater area than are covered by a single data link beacon. Thus, satellite communication is a requirement for a wide-area system. A wide-area network is essentially a satellite tracking network. GPS adds unique capabilities to the tracking network. Each tracking station, or reference node, is relatively inexpensive, in terms of receiver hardware and each can track many satellites simultaneously. An abundance of data allows tracking stations to do time transfer, or reference node clock synchronization, at the same time they are tracking the satellites. Algorithmically, the simplest wide-area network is a patchwork of common-view networks. Each small network patch supports a NDGPS beacon that services a small area. No reference station clock synchronization, or any substantial integration of any kind, is necessary. At a station-to-station separation of 200 kilometers, a network of less than 200 stations could cover the continental United States, providing universal common-view NDGPS PRCs of excellent accuracy for single-frequency users as well as PRC gradients for single-frequency survey applications.

The next simplest approach algorithmically is a much sparser network on a much grander scale, the dual-frequency world-wide (WWDGPS) tracking network. A sample network with thirty-three reference stations located around the world generates enough measurements to instantaneously solve for satellite position, satellite clock error and synchronize the reference stations. In addition, there are enough redundant measurements to do validity testing and accommodate two or three reference station failures. WWDGPS navigation accuracy is estimated by the inventors to be on the order of one meter for a P-code system user. The same network gathers a sufficient number of absolute ionospheric delay measurements to determine near real-time updates to a global ionospheric model (used by single-frequency users). The algorithm is a straightforward application of least-squares, with 96 unknown satellite coordinates (24 satellites, each with three position errors and one clock error). Thirty-two reference clock errors are measured by over two hundred pseudoranges. An observation matrix for a least-squares estimator is created from the pseudorange equation, given range equation (SV I, reference node J):

$$R_{ij} = |SV\ Pos_i - Ref\ Pos_j| + SV\ Clock_i - Ref\ Clock_j + Noise$$

The unknowns are three SV position errors for each SV, one SV clock error for each SV and one reference clock error for each reference station. (The equation assumes that the ionospheric and tropospheric delay errors are removed at each of the reference stations.) Satellite velocities and satellite reference frequencies are solved for with the same observation matrix using the carrier measurements. In a worldwide network with a little over thirty reference stations, all satellite position and clock errors can be determined directly from the instantaneous data. With fewer than twenty stations, there is not enough measurement data to resolve the system errors, so an orbital dynamics model is required to collect enough information for the estimator. In spite of the extra hardware cost of a larger, fully-measured system, there are several worthwhile advantages, including survivability in the face of reference station failures and complete visibility into most or all satellite soft failures, especially in the control systems. Even so, data-link loading from the reference stations to the central processing facility, which is a major recurring cost, is roughly the same.

Once the satellites' positions and clock errors have been estimated, satellite position and clock motion can be tracked continuously by a fully-measured network with dual-frequency (ionospherically corrected) carrier data that is commonly available in survey-quality receivers without P-code capability. Consequently, a world-wide system can run accurately on dual-frequency carriers once satellite positions and clock estimates have been initialized. The difficulty is in finding these initial estimates, because they can not be easily calculated where direct ionospheric measurements are not available. The dual-carrier WWDGPS estimates converge fairly quickly using data collected for night-time ionospheric conditions.

The same can hold true even for wide-area networks covering smaller portions of the globe. The difficulty with smaller networks is creating the initial estimate of the satellite position and satellite clock. This hurdle must be overcome more than once, because a regional system will not be able to track each satellite through its whole orbit and so each satellite returning after an absence away from the network must be re-initialized.

Networked DGPS provides local, regional, or worldwide differential corrections for use in real-time navigation or survey applications. With a wide-area network, identification of the key correlated DGPS errors (e.g., orbit and ionospheric errors) allows the NDGPS correction accuracy to be spatially independent relative to the reference point location. Since these specific errors vary slowly, lower frequency broadcasts of these corrections can be made to lower communications costs. Wide-area networks also permit the use of a sparse matrix of reference stations. One of the traditional disadvantages of wide-area networks are the higher communications costs since satellite data transmissions may be required.

Therefore, what is required for non-authorized users that require high accuracy GPS position determinations is a networked differential GPS system of reference and control stations that is capable of providing correction information regardless of a user's particular location apart from a reference station and in spite of any selective availability concerns.

SUMMARY OF THE PRESENT INVENTION

It is therefore an object of the present invention to provide a system on a worldwide or regional basis that is capable of providing differential GPS correction information regardless of a user's particular separation from any nearest reference station and in spite of any selective availability concerns.

Briefly, an embodiment of the present invention is a network of differential GPS reference stations (NDGPS) that continually track the entire GPS satellite constellation and provide interpolations of reference station corrections tailored for particular user locations between the reference stations. Each reference station takes real-time ionospheric measurements with codeless cross-correlating dual-frequency carrier GPS receivers and computes real-time orbit ephemerides independently. An absolute pseudorange correction (PRC) is defined for each satellite as a function of a particular user's location. A map of the function is constructed, with "iso-PRC" contours much like isobar contours on a weather map. The object of the network is to measure the PRCs at a few points, so-called reference stations and to construct an iso-PRC map for each satellite. Corrections are interpolated for each user's site on a subscription basis. The data bandwidths are kept to a minimum by transmitting information that cannot be obtained directly by the user and by updating information by classes and according to how quickly each class of data goes stale given the realities of the GPS system. Sub-decimeter-level kinematic accuracy over a given area is accomplished by establishing a mini-fiducial network.

Advantage of the present invention is that an NDGPS system is provided that is able to compensate for the problem of separation between a corresponding reference station and user.

Another advantage of the present invention is that an NDGPS system is provided that eliminates the problem of DGPS users on the fringe seeing satellites not also visible to a single reference station.

Another advantage of the present invention is that an NDGPS system is provided that is more robust, being able to detect and recover from equipment failure in one of the reference stations.

Another advantage of the present invention is that an NDGPS system is provided that compares well to the cost of more reference stations and a network of data links.

These and other objects and advantages of the present invention will no doubt become obvious to those of ordinary skill in the art after having read the following detailed description of the preferred embodiments which are illustrated in the various drawing figures.

IN THE DRAWINGS

FIG. 8 is a diagram of the special message Type 25 transmitted to the users of FIG. 1.

DETAILED DESCRIPTION OF THE PREFERRED EMBODIMENTS

Figure 1:
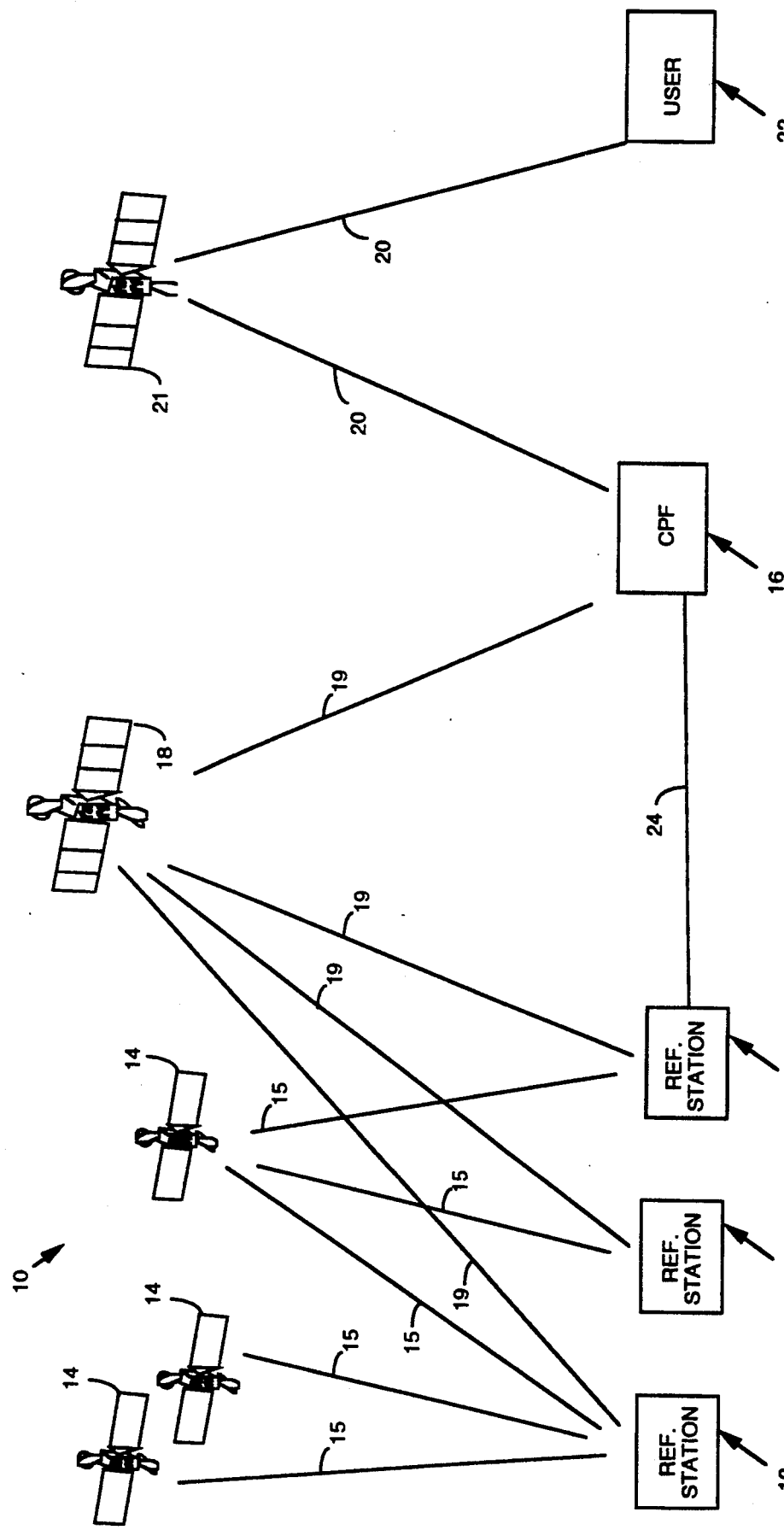
FIG. 1 is a system block diagram of the worldwide differential GPS (WWDGPS) network, and incorporating a first embodiment of the present invention.

FIG. 1 illustrates a worldwide differential GPS (WWDGPS) network 10. WWDGPS 10 comprises a plurality of reference stations 12 in communication with a plurality of GPS satellites 14 transmitting signals 15 and belonging to the GPS constellation and a central processing facility (CPF) 16 in communication with the reference stations 12 b way of a communications satellite 18 that supports a plurality of very small aperture terminal (VSAT) datalinks 19 to CPF 16. In turn, CPF 16 broadcasts differential GPS correction information 20 via a communications broadcast satellite 21 to a plurality of users 22, which can include DGPS services, direct mobile users and even the National Aeronautics and Space Administration (NASA) in support of the well-known space shuttle (STS) missions. A plurality of back-up land-links 24 couple the reference stations 12 to CPF 16. Candidate sites for the reference stations 12 are preferably selected according to the availability of reliable power, stable political environments, physical accessibility and avoidance of the ionospherically unstable regions near the North and South poles. A final selection criteria is to prefer international airports, military bases and observatories or universities.

Figure 2:
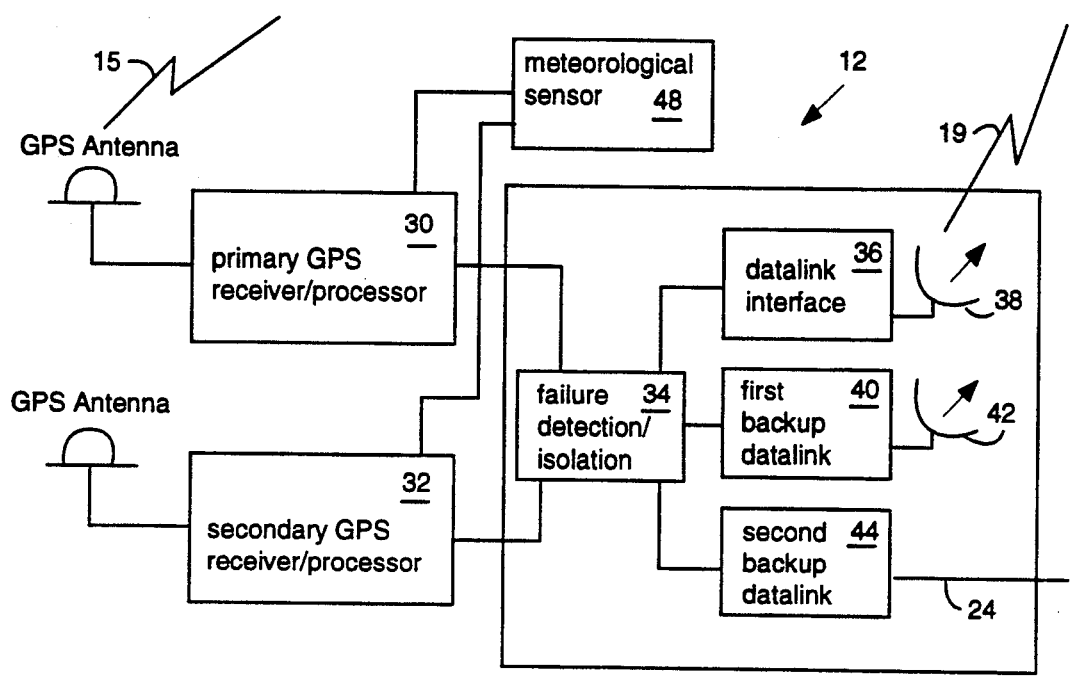
FIG. 2 is a block diagram of a typical reference station of the WWDGPS of FIG. 1.

FIG. 2 illustrates a typical reference station 12 which comprises a primary GPS receiver/processor 30, a backup GPS receiver/processor 32 for redundancy, a failure detection and isolation unit 34, a datalink interface 36, a VSAT satellite link antenna 38, a first backup datalink 40, a backup VSAT satellite link antenna 42, a second backup datalink 44 connected to the landlines 24 and a meteorological sensor system 48. Receiver/processors 30 and 32 are Trimble Navigation Limited model full P-code receivers. Since a significant number of reference station 12 failures can be caused by site-wide catastrophes (e.g., fire or acts of nature), an alternative to including backup elements 32, 40, 42 and 44 is to configure WWDGPS 10 with excess reference stations 12 and with computational programs in CPF 16 that can tolerate the loss of any one or two reference stations 12. Receiver/processors 30 and 32 are sixteen-channel L1/L2 P-code survey types. Sensor 12 provides local weather information, such as temperature, relative humidity and barometric pressure, to allow receiver/processors 30 and 32 to correct for tropospheric errors associated with the site of the corresponding reference station 12. Reference stations 12 measure SV data such as pseudorange (PR), accumulated delta range (ADR), and meteorological data. Tropospheric and ionospheric delays are computed. Corrected PR, ADR and ionospheric delays are transmitted to CPF 16 via VSAT datalink 19 or landlines 24. Datalink 19 typically supports 600 bits per second (bps) simplex data and 150 bps duplex control.

Figure 3:
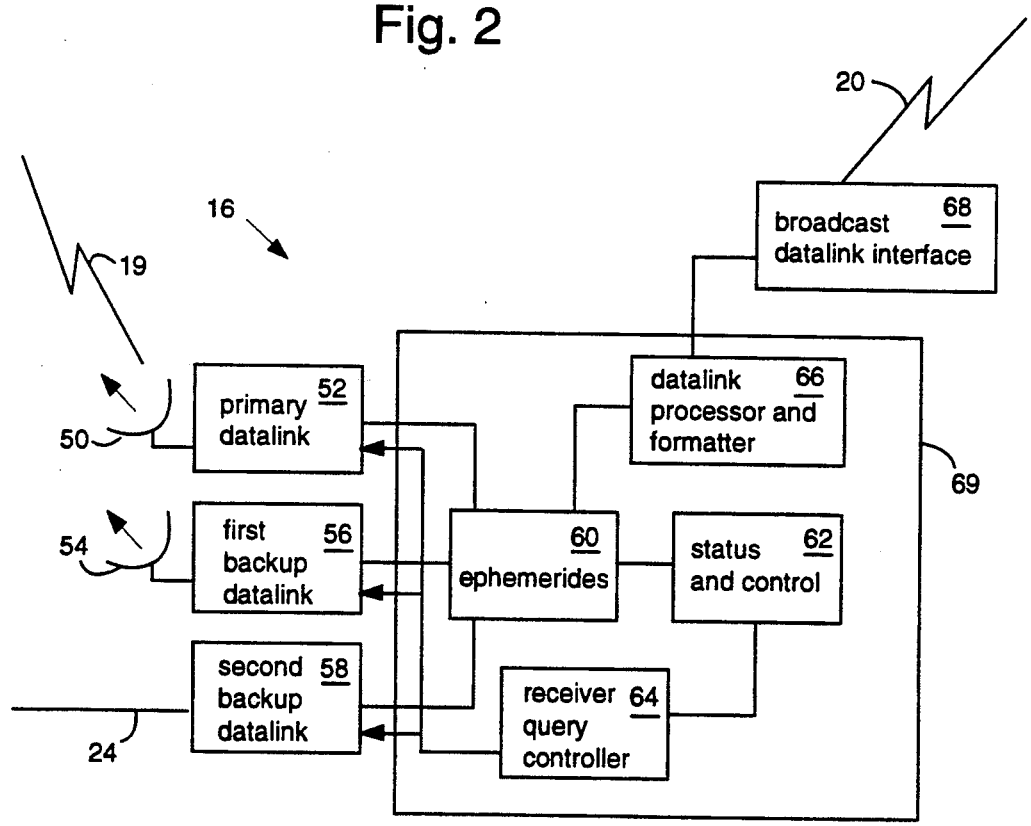
FIG. 3 is a block diagram of central processing facility of the WWDGPS of FIG. 1.

FIG. 3 illustrates that CPF 16 is comprised of a VSAT antenna 50, a primary datalink 52, a backup VSAT antenna 54, a first backup datalink 56, a second backup datalink 58 connected to the landlines 24, a unit 60 that processes measurements and corrects and computes ephemerides, a unit 62 to do system status and control functions, a receiver query controller 64, a datalink processor and formatter 66 and a GPS correction broadcast datalink interface 68 to output GPS correction information 20. CPF 16 further comprises a central processor 69 that is used for general control and execution of the items discussed in connection with FIG. 6, herein. CPF 16 establishes SV integrity by filtering to remove reference station clock errors, estimates SV clock errors and estimates SV orbit errors. A network ionospheric filter produces estimates for worldwide ionospheric model corrections. The list of items transmitted to users 22 comprises an SV integrity message, a NAV message validation, SV clock corrections, SV orbit corrections and ionospheric model corrections.

Figure 4:
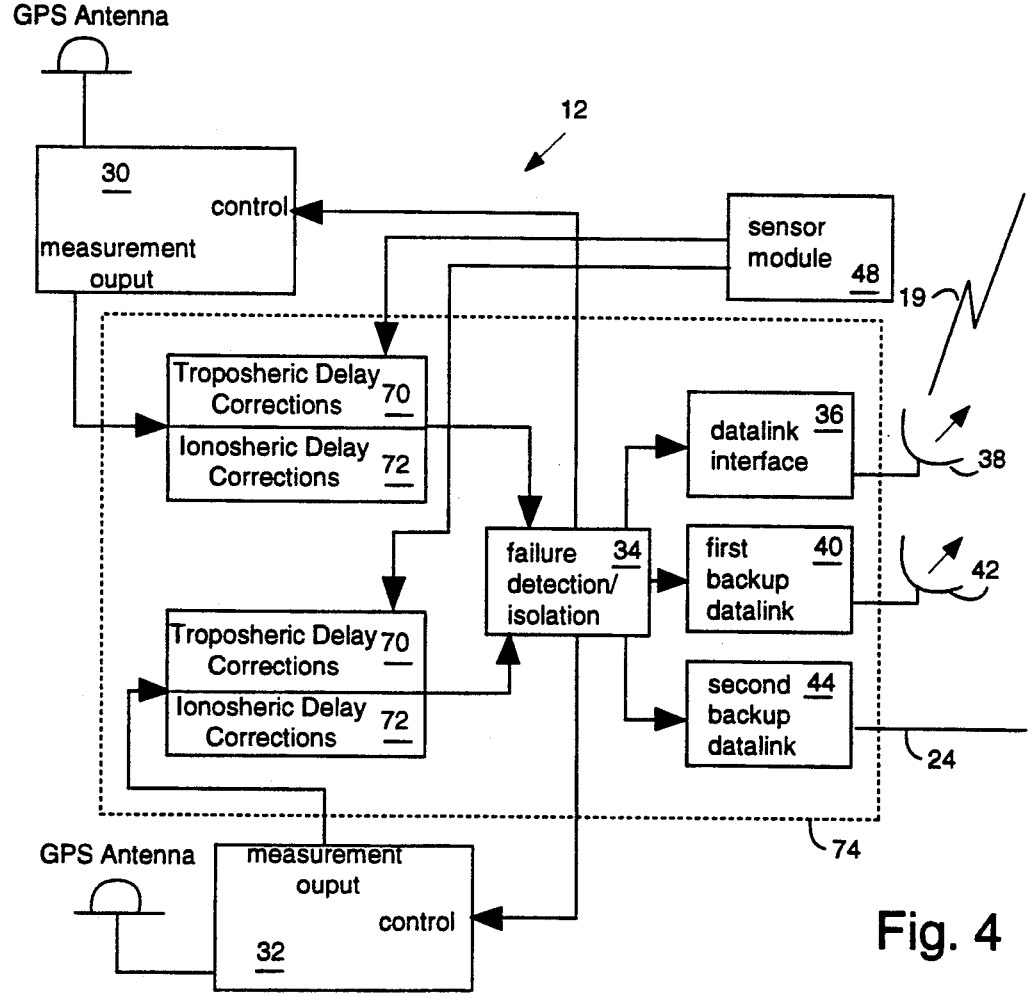
FIG. 4 is a second level block diagram of the reference station of FIG. 2.

FIG. 4 illustrates a variation on that of FIG. 2 and includes measurement pre-processing, in the form of a process to tropospheric corrections 70 and a process to do ionospheric delay corrections 72 that are done within a microcomputer 74. Computer-implemented processes running on microcomputer 74 can be used to implement unit 34 and datalink interfaces 36, 40 and 44. Tropospheric delays are useful only to a local user and so are not saved.

Figure 5:
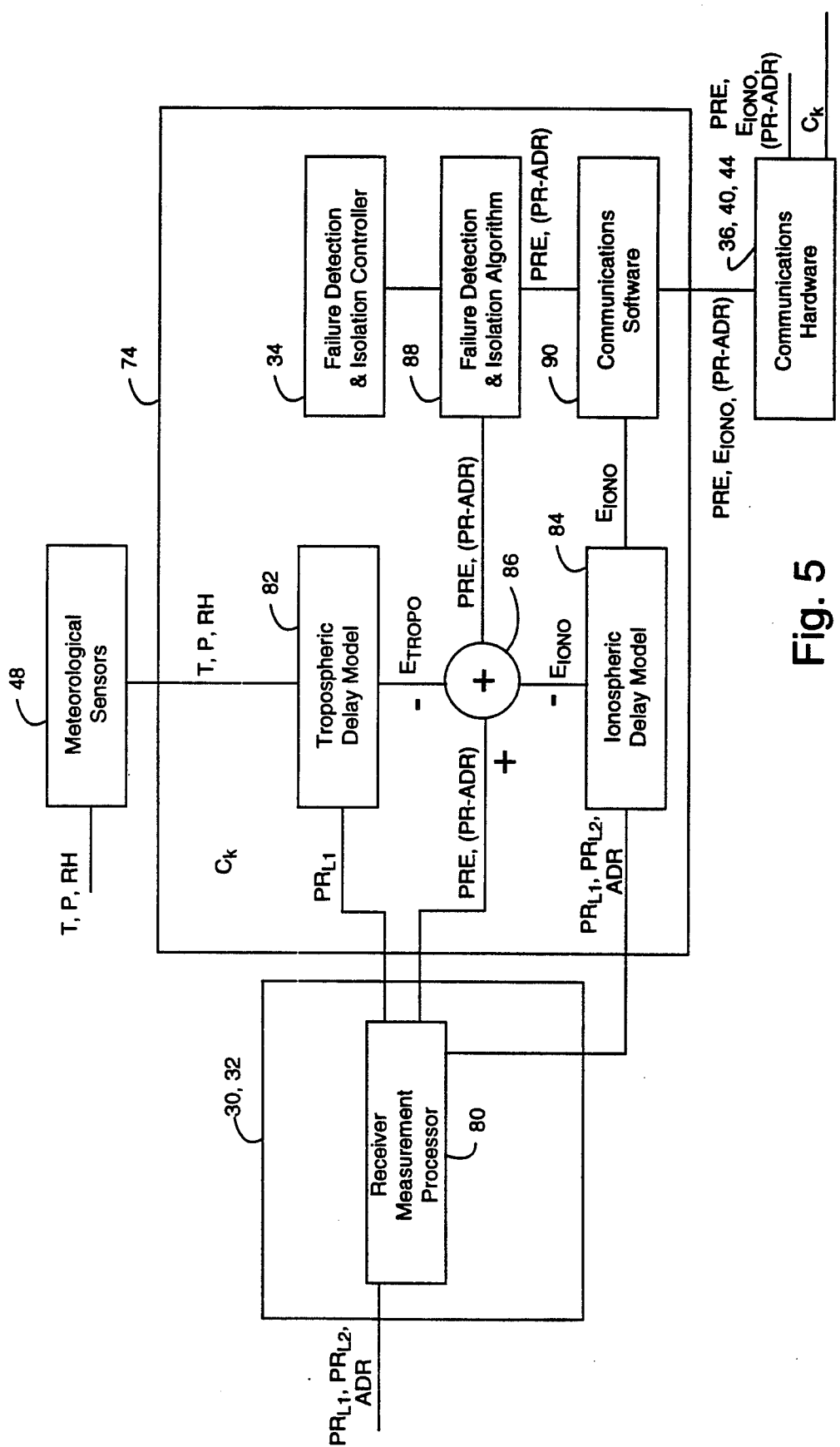
FIG. 5 is a data flow diagram for the reference station of FIGS. 2 and 4.

FIG. 5 schematically illustrates the data flows in reference station 12. Pseudoranges for carriers L1 ($PR_{L1}$) and L2 ($PR_{L2}$), ADR and SV clock (Ck) are measured by a receiver measurement processor 80. PRL1 is output to a tropospheric delay model 82. Tables 2A-2C list the input, method and output used to implement model 82. Temperature (T), pressure (P), and relative humidity (RH) are output from sensors 48 to model 82. Receiver measurement processor 80 outputs PRL1, PRL2 and ADR to an ionospheric delay algorithm 84, which produces an ionospheric error ($E_{iono}$). Tables 3A-3C list the input, method and output used to implement model 84. A tropospheric error ($E_{tropo}$) is output to a mixer 86 and is used with $E_{iono}$ to correct a pseudorange error (PRE), and PR-ADR. A failure detection and isolation algorithm 88 accepts the PRE and PR-ADR to control unit 34. Algorithm 88 checks the health of each SV 14 and can exclude measurements that are likely to be erroneous. A communications software 90 transmits PRE, Eiono and PR-ADR to the communications hardware comprising elements 36, 40 and 44. .Tropospheric delay model 82 is comprised of one of the following models known to those skilled in the art: Chao, Hopfield Zenith, Goad & Goodman, Saastamoinen Zenith, Saastamoinen Standard, or Davis. Which one to chose is an engineering design choice that will be influenced by the user's needs and the respective advantages and disadvantages of each model.

TABLE 2A
TROPOSPHERIC DELAY MODEL INPUTS

| | | |
|---|---|---|
| $\epsilon_{ij}$ | = | elevation angle from station$_i$ to SV$_j$ |
| $h_o$ | = | orthometric height of station (km) |
| $\phi_o$ | = | station latitude (degrees) |
| $P_o$ | = | atmospheric pressure (millibars) |
| $T_o$ | = | temperature (°K) |
| RH | = | relative humidity (fraction of 1) |

TABLE 2B
TROPOSPHERIC DELAY MODEL ALGORITHM

| | |
|---|---|
| $g' = 1 + 0.0026 \cos 2\phi + 0.00028\, h_o$ | standard gravity correction |
| $e_o = 6.108 RH\, e^{\frac{[17.15 T_o - 4684]}{[T_o - 38.45]}}$ | water vapor pressure |
| $D_{TZ} = \frac{0.002277}{g} \left\{ P_o \left[ \frac{1255}{T_o} + 0.05 \right] e_o \right\}$ | tropospheric zenith delay |
| $G = \frac{0.002644}{g'} e^{-(0.14372 h_o)}$ | surface meteorology mapping function |
| $\chi = \frac{G}{D_{TZ}}$ | |
| $MF = \dfrac{1 + \chi}{\sin \epsilon_{ij} + \dfrac{[\chi/[1 + \chi]]}{[\sin \epsilon_{ij} + 0.015]}}$ | mapping function |
| $\Delta P_{TROPO,ij} = D_{TZ} MF$ | code equivalent total tropospheric delay |

TABLE 2C
TROPOSPHERIC DELAY MODEL OUTPUTS

| | | |
|---|---|---|
| $\Delta P_{TROPO,ij}$ | = | code equivalent tropospheric delay for station$_i$ to SV$_j$ at one epoch (time period) |

TABLE 3A
IONOSPHERIC GROUP DELAY INPUTS

| | | |
|---|---|---|
| $f_1, f_2$ | = | $L_1$ & $L_2$ carrier frequencies |
| $P_{L1,ij}, P_{L2,ij}$ | = | $L_1$ & $L_2$ pseudorange at one epoch for i'th reference station & SV$_j$ |
| $\epsilon_{ij}, \alpha_{ij}$ | = | elevation & azimuth angle for these pseudoranges for reference station$_i$ & SV$_j$ |

TABLE 3B
IONOSPHERIC GROUP DELAY ALGORITHM $$\Delta P_{IONO,ij} = \frac{[P_{L2,ij} - P_{L1,ij}]\, f_{L2}^2}{[f_{L1}^2 - f_{L2}^2]}$$

code equivalent ionospheric delay at one epoch

TABLE 3C
IONOSPHERIC GROUP DELAY OUTPUTS

| | | |
|---|---|---|
| $\epsilon_{ij}, \alpha_{ij}$ | = | elevation & azimuth angle for reference station$_i$ & SV$_j$ at one epoch |
| $\Delta P_{IONO,ij}$ | = | line-of-sight ionospheric delay for |

Figure 6:
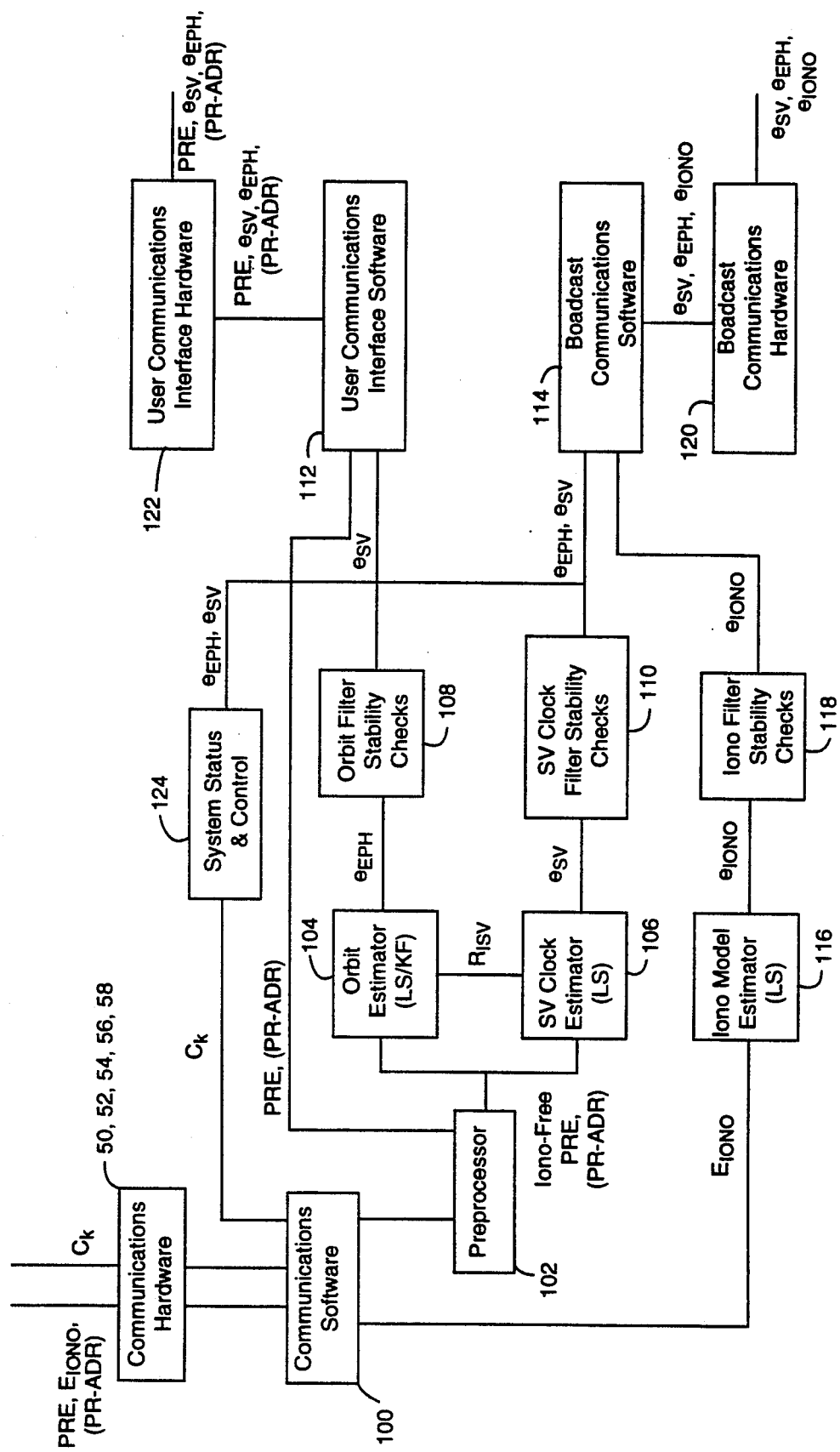
FIG. 6 is a data flow diagram for the central processing facility of FIG. 3.

TABLE 3C-continued
IONOSPHERIC GROUP DELAY OUTPUTS station$_i$ & SV$_j$ at one epoch CPF 16 receives the reference station 12 measurements via network communication satellite links. Network corrections are transmitted to a user 22, which may do additional processing, prior to transmitting the corrections to another user 22. A typical user 22 will have its own GPS receiver and may have additional navigation sensors such as accelerometers, especially when used in high dynamic environments. If user 22 has an authorized P-code GPS receiver, the SV's selective availability clock dither is removed from the unclassified SV clock corrections provided by the CPF 16. Separately, the CPF 16 broadcasts the corrections to individual civilian users 22 such as differential GPS service providers. Assuming each reference station 12 is tracking eight SV's, each reference station 12 needs a communications bandwidth of 300 bps for measurement data, 300 bps for data overhead and 300 bps for command and control. CPF 16 requires a communications bandwidth of 19,800 bps for thirty-three reference stations 12 at 600 bps each, NAV data requires 1,200 bps for twenty-four SV's at fifty bps per SV and 9,900 bps for command and control FIG. 6 illustrates the data flow in CPF 16. PRE, $E_{iono}$ and PR-ADR are received by communications hardware 50, 52, 54, 56 and 58 and transferred by a communications software 100 to a preprocessor 102, which uses a carrier-smoothed, ionospheric-free code Hatch filter:

$$\hat{P}_i = [f^2_{L1}/(f^2_{L1} - f^2_{L2})]\, \hat{P}_{i,L1} - [f^2_{L1}/(f^2_{L1} - f^2_{L2})]\, \hat{P}_{i,L1}.$$

Tables 4A–4C list the input, method and output used in the implementation of preprocessor 102.

TABLE 4A
PREPROCESSOR INPUTS

| | | |
|---|---|---|
| $P_{k,L1/2}$ | = | pseudorange on L1 or L2 (k'th epoch) |
| $D_{k,L1/2}$ | = | Doppler count on L1 or L2 (k'th epoch) |
| $R_i, R_j$ | = | reference receiver (i'th) & SV (j'th) position vectors |
| $f_{L1}, f_{L2}$ | = | L1 and L2 carrier frequencies (constants) |
| N | = | smoothing window maximum epoch count |

TABLE 4B
PREPROCESSOR ALGORITHM $$e_{ij} = \left( \frac{R_j - R_i}{|R_j - R_i|} \right)$$

If k > N or there is a cycle slip on the L1 or L2 carrier, set k = 0 and go to the $P_{0,L1/2}$ calculations $D_k = [f^2_{L1}/(f^2_{L1} - f^2_{L2})]D_{k,L1} - [f^2_{L2}/(f^2_{L1} - f^2_{L2})]D_{k,L2}$    ionospheric-free carrier code-equivalent, integrated Doppler $M_{k,L1/2} = 2 D_k - D_{k,L1/2}$

TABLE 4B-continued
PREPROCESSOR ALGORITHM

| | |
|---|---|
| | differences on L1 or L2 |
| $P_{0,L1/2} = \frac{1}{(k+1)} \sum_{l=0}^{k} \left\{ P_{1,L1/2} - \sum_{m=1}^{L} M_{m,L1/2} \right\}$ | carrier-smoothed initial code on L1 or L2 |
| $\hat{P}_{k,L1/2} = P_{0,L1/2} + \sum_{l=1}^{k} M_{l,L1/2}$ | carrier-smoothed code on L1 or L2 |
| $\hat{P}_k = \left[ \frac{f_{L1}^2}{(f_{L1}^2 - f_{L2}^2)} \right] \hat{P}_{k,L1} - \left[ \frac{f_{L2}^2}{(f_{L1}^2 - f_{L2}^2)} \right] \hat{P}_{k,L2}$ | Carrier-Smoothed, Ionospheric-Free Code -HATCH FILTER |
| $\Delta \rho_{ij} = \hat{P}_k - [R_i - R_j]^T e_{ij}$ | ionospheric-free pseudorange error |

TABLE 4C
PREPROCESSOR OUTPUT

| | | |
|---|---|---|
| k | = | carrier-smoothed, ionospheric-free pseudorange (epoch$_k$) |
| $\Delta \rho_{ij}$ | = | ionospheric-free pseudorange error (Ref. Station$_i$, SV$_j$) |

In FIG. 6, ionospheric delays are removed from (PR-ADR) and PRE in the preprocessor 80 and the corrected data is sent to an orbit estimator 104 that uses a least-squares and Kalman filter (LS/KF) and a SV clock estimator 106 that uses a least-squares (LS) filter. Tables 5A–5C list the input, method and output used in the implementation of orbit estimator 104. An estimate ($e_{EPH}$) is output to an orbit filter stability checker 108. Estimator 106 produces a SV clock estimate ($e_{sv}$) that is then applied to an SV clock filter and stability checker 110. Filtered $e_{EPH}$ and $e_{sv}$ are sent to a user communications interface software 112 and then to a broadcast communications software 114 Communications software 100 also provides ionospheric delay measurements to an ionospheric estimator 116 with an LS filter to produce an ionospheric estimate ($e_{ionospheric}$). An ionospheric filter stability checker 118 processes the estimate and sends it to the broadcast communications software 114. The estimates are then transmitted out by a communication hardware system 120, for example through interface 68 (FIG. 3). A user communications interface hardware transmits out PRE, $e_{sv}$, $e_{EPH}$ and (PR-ADR).

Figure 7:
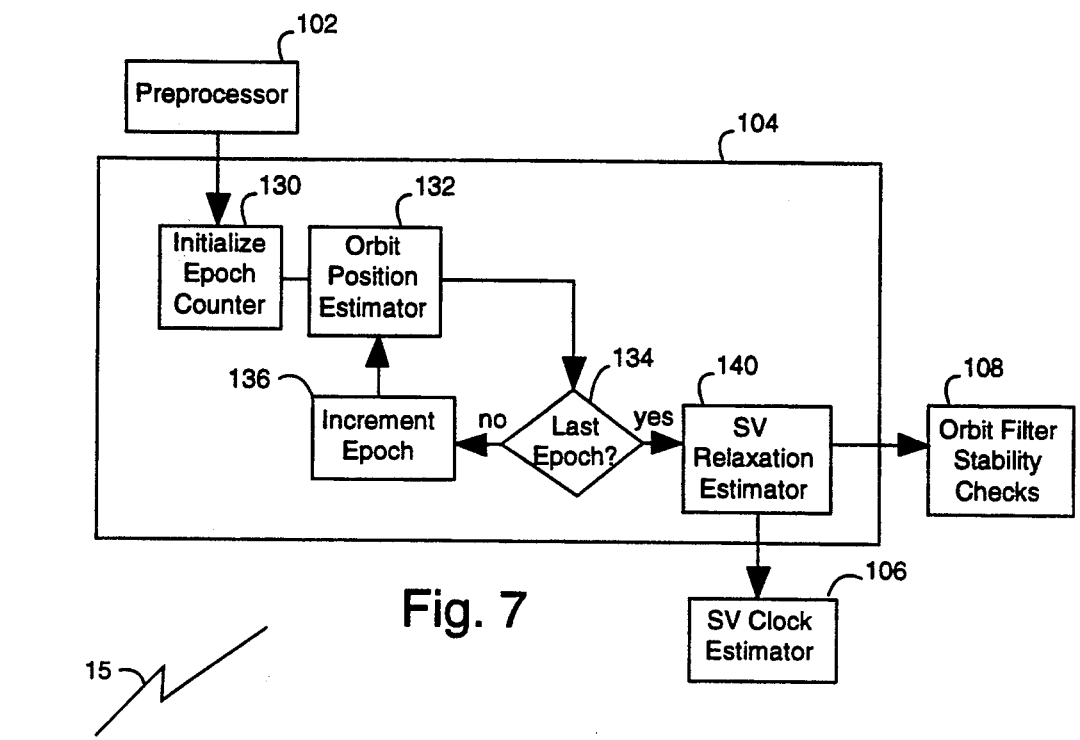
FIG. 7 is a diagram of the orbit position estimator of FIG. 6.

Orbit estimator 104 is shown in greater detail in FIG. 7.

The conventional orbit determination approach is to use Newton's equations of motion. An inertial coordinate system is selected with the origin at the nominal center of the earth. Models for all the forces acting on an SV 14 are used to obtain the accelerations experienced by SV 14. These are then integrated to obtain the orbit of each SV 14. The magnitude of these accelerations and the corresponding position errors is such that not only must the earth, moon and sun gravitational force fields be considered for determining SV 14 orbits, but also the gravitational forces from ocean and solid earth tides, as well as the direct pressure caused by the sun and the Earth's albedo.

Determining an orbit using Newton's equations of motion that will be fresh enough to last an hour requires that the gravitational accelerations from a four-by-four earth gravity model, a point mass moon gravity model and a point mass solar gravity model be used. For more precise orbit estimations, variations in the exact rotation and location of the center of rotation of the earth also need to be considered, together with the higher order accelerations discussed above. The advantage of good orbit estimation is that the orbit corrections can be communicated at a substantially lower rate than, for example, the SV clock corrections. The reduced data rates are used to lower datalink 19 and 20 requirements.

The orbit estimator 104 is preferably based on a two-step procedure that estimates the orthogonal earth-center fixed orbit position errors for all SV's at one epoch. SV 14 position errors, derived from several epochs, are used to estimate the Keplerian element uncertainties of the broadcast ephemeris for each Sv.

Using carrier-smoothed pseudoranges that have been tropospherically and ionospherically corrected as inputs, a measurement vector, $Y_k$, can be constructed that contains all the pseudoranges at one epoch from all reference stations 12. A state vector $X_k$ includes reference station 12 clock errors, SV 14 clock errors and SV 14 position errors. A Housholder transformation matrix is selected, [$D_{OR}$], in which the product of the matrix and the measurement matrix [B] of the partials of pseudorange errors with respect to the reference receiver clock errors, is zero: [$D_{OR}$][B]=0. The transformation is used to eliminate the unwanted reference receiver clock errors in $Y_k$ leading to a corrected measurement vector $y_k$. A Least-squares estimator is then used to compute SV 14 position errors $x_k$ for all SV's at one epoch from $y_k$.

The next step is to aggregate a number of SV position error vectors $p_k$ from several epoch's for a single SV, into a new measurement vector z. A new state vector $x_2$ is formed that includes the 15 uncertainties in the broadcast ephemeris. A least-squares estimator is used to estimate these ephemeris uncertainties for the SV from z. The procedure is then repeated for all the other SV's. Based on a potential problem in the observability of the argument of perigee correction $\delta\omega_o$ because to its correlation with the mean anomaly $\delta M_o$ it may be desirable to eliminate that error term from the state vector, leaving only fourteen SV 14 ephemeris corrections to be estimated.

TABLE 5A
ORBIT POSITION ERROR ESTIMATOR INPUTS

| | | |
|---|---|---|
| $\Delta\rho_{ij}$ | = | ionospheric-free, carrier-smoothed, pseudorange error |
| $e_{ij}$ | = | (SVj visible at ref. station$_i$) line-of-sight unit vector |

Set up clock and orbit position error observation matrices, $[B]_k$ and $[H]_k$, based on the SV's tracked by each reference station:

If the first reference station saw (7) PRN's: 1,4, ..., 21; the second saw (5): 3,4, ..., 21; and the 33rd saw (8): 6, ..., 24; then:

$$[B]_k =$$

$$\begin{bmatrix}
1 & 0 & 0 & 0 & 0 & 0 & 0 & \ldots & 0 & 0 & 0 & 0 & 0 \\
1 & 0 & 0 & 0 & 0 & 0 & 0 & \ldots & 0 & 0 & 0 & 0 & 0 \\
\vdots & & & & & & & & & & & & \vdots \\
1 & 0 & 0 & 0 & 0 & 0 & 0 & \ldots & 0 & 0 & 0 & 0 & 0 \\
0 & 1 & 0 & 0 & 0 & 0 & 0 & \ldots & 0 & 0 & 0 & 0 & 0 \\
0 & 1 & 0 & 0 & 0 & 0 & 0 & \ldots & 0 & 0 & 0 & 0 & 0 \\
\vdots & & & & & & & & & & & & \vdots \\
0 & 1 & 0 & 0 & 0 & 0 & 0 & \ldots & 0 & 0 & 0 & 0 & 0 \\
\vdots & & & & & & & & & & & & \vdots \\
0 & 0 & 0 & 0 & 0 & 0 & 0 & \ldots & 0 & 0 & 0 & 0 & 1 \\
1 & 2 & 3 & 4 & 5 & 6 & 7 & \ldots & 29 & 30 & 31 & 32 & 33
\end{bmatrix}$$

Station's $$\begin{bmatrix}
-1 & 0 & 0 & 0 & 0 & 0 & 0 & \ldots & 0 & 0 & 0 & 0 & 0 \\
0 & 0 & 0 & -1 & 0 & 0 & 0 & \ldots & 0 & 0 & 0 & 0 & 0 \\
\vdots & & & & & & & & & & & & \vdots \\
0 & 0 & 0 & 0 & 0 & 0 & 0 & \ldots & 0 & -1 & 0 & 0 & 0 \\
0 & 0 & -1 & 0 & 0 & 0 & 0 & \ldots & 0 & 0 & 0 & 0 & 0 \\
0 & 0 & 0 & -1 & 0 & 0 & 0 & \ldots & 0 & 0 & 0 & 0 & 0 \\
\vdots & & & & & & & & & & & & \vdots \\
0 & 0 & 0 & 0 & 0 & 0 & 0 & \ldots & 0 & -1 & 0 & 0 & 0 \\
\vdots & & & & & & & & & & & & \vdots \\
0 & 0 & 0 & 0 & 0 & 0 & 0 & \ldots & 0 & 0 & 0 & 0 & -1 \\
1 & 2 & 3 & 4 & 5 & 6 & 7 & \ldots & 20 & 21 & 22 & 23 & 24
\end{bmatrix}$$

PRN's $$[H]_k =$$

$$\begin{bmatrix}
e^T_{1,1} & 0^T & 0^T & 0^T & 0^T & 0^T & 0^T & \ldots & 0^T & 0^T & 0^T & 0^T & 0^T \\
0^T & 0^T & 0^T & e^T_{1,2} & 0^T & 0^T & 0^T & \ldots & 0^T & 0^T & 0^T & 0^T & 0^T \\
\vdots & & & & & & & & & & & & \vdots \\
0^T & 0^T & 0^T & 0^T & 0^T & 0^T & 0^T & \ldots & 0^T & e^T_{1,7} & 0^T & 0^T & 0^T \\
0^T & 0^T & e^T_{2,1} & 0^T & 0^T & 0^T & 0^T & \ldots & 0^T & 0^T & 0^T & 0^T & 0^T \\
0^T & 0^T & 0^T & e^T_{2,2} & 0^T & 0^T & 0^T & \ldots & 0^T & 0^T & 0^T & 0^T & 0^T \\
\vdots & & & & & & & & & & & & \vdots \\
0^T & 0^T & 0^T & 0^T & 0^T & 0^T & 0^T & \ldots & 0^T & e^T_{2,5} & 0^T & 0^T & 0^T \\
\vdots & & & & & & & & & & & & \vdots \\
0^T & 0^T & 0^T & 0^T & 0^T & 0^T & 0^T & \ldots & 0^T & 0^T & 0^T & 0^T & e^T_{33,8} \\
1 & 2 & 3 & 4 & 5 & 6 & 7 & \ldots & 20 & 21 & 22 & 23 & 24
\end{bmatrix}$$

PRN'S $[A]_k = [B|H]_k$    Composite observation matrix $[B'|H'|y]_k = \{D_{OR}\}_k [A|Y]_k$    Housholder transformed observation matrix and vector $\{D_{OR}\}_k$ = Combined set (vector and matrix) of Housholder transforms $$Y_k = \begin{vmatrix} \Delta\rho_{11} \\ \Delta\rho_{12} \\ \vdots \\ \Delta\rho_{ij} \\ \vdots \\ \Delta\rho_{33,j} \end{vmatrix}_k$$

Check if: $[B']_k << [I]$?

If not, write error message or abort orbit position estimator 104 for this epoch (time period).

Check if: $[H']_k$ is full rank?
If not, write error message or abort orbit position estimator 104 for this epoch.

$$x_k = \begin{vmatrix} \delta x_1 \\ \delta y_1 \\ \delta z_1 \\ \delta x_2 \\ \cdot \\ \cdot \\ \cdot \\ \delta z_{24} \end{vmatrix}_k = \{[H']_k^T [H']_k\}^{-1} [H']_k^T y_k$$

TABLE 5C

| ORBIT POSITION ERROR ESTIMATOR OUTPUTS | | |
|---|---|---|
| $x_k$ | = | orbit position error vector (x,y,z; 24 SV's; k'th epoch) |

FIG. 7 illustrates a method of implementing orbit position estimator 104. The method comprises a step 130 for initializing an epoch counter, a step 132 to do orbit position estimation, a step 134 that tests to see if the current epoch is the last one, a step 136 that increments the epoch counter and a step 140 that implements an orbit relaxation estimator 142. Preprocessor 102 feeds in the measurements from SVs 14. Step 132 estimates the XYZ position for all of the SVs 14 epoch by epoch. Each estimate for each SV 14 involves three parameters. Six to ten epochs are aggregated by step 134 (in a loop). Each thirty to sixty minutes the aggregate is supplied to the orbit relaxation estimator step 140, which estimates fifteen orbit parameter corrections each thirty to sixty minutes. The fifteen orbit parameter corrections are fairly stable and will stay fresh for thirty to sixty minutes, so they need only be communicated to users 22 that often.

CPF SOFTWARE REQUIREMENTS

A review of the orbit determination literature indicates that conventional approaches can be separated into three categories to formulate the orbit estimation problem in terms of the Keplerian (non-orthogonal) elements, the orthogonal orbit plane coordinates, or the classical inertial coordinates. The differential equations describing the orbit errors in Keplerian element form are the Lagrange Planetary Equations. The Keplerian element formulation is easy to use, because for a perfectly circular orbit, the Keplerian elements are constants. Thus, for the nearly circular orbits of GPS satellites 14, the changes in the Keplerian elements is small. This was one of the considerations by the CPS Joint Program Office that led to the selection of the Broadcast Ephemeris in terms of a modified set of Lagrange Planetary Equations. Specifically, a broadcast ephemeris, which is a best fit of the orbital measurements, is made by the system 10 with Lagrange Planetary Equations using six initial Keplerian elements, three initial Keplerian element rates and six perturbation coefficients to the Keplerian elements.

An alternative approach is to use the orbit plane orthogonal coordinate approach, the differential equations of which are known as Hill's equations:

$$\ddot{R} - 3n_o^2 \, \partial R - 2n_o \, \partial \dot{T} = \partial A_R$$

$$\partial \ddot{T} + 2n_o \, \partial \dot{R} = \partial A_T$$

$$\partial \ddot{N} + n_o^2 \, \partial N = \partial A_N.$$

These equations reflect approximations that can be made because of small eccentricities of the orbits of SV's 14. While the general solution is written in terms of sines, cosines and time polynomials, Colombo found that for the GPS satellite orbits the specific solution:

$$\partial R(t) = a_R \cos(n_o t) + b_R \sin(n_o t) + c_R t \cos(n_o t) + d_R t \sin(n_o t) + e_R$$

$$\partial T(t) = a_T \cos(n_o t) + b_T \sin(n_o t) + c_T t \cos(n_o t) + d_T t \sin(n_o t) + e_T + f_T t + g_T t^2$$

$$\partial N(t) = a_R \cos(n_o t) + b_N \sin(n_o t) + c_N t \cos(n_o t) + d_N t \sin(n_o t) + e_N + f_N t$$

provides good accuracy. Since the solution requires no integrations, the unknown coefficients are determined by a direct least-squares fit of the GPS measurements rotated into orbit plane coordinates. The present invention uses least-squares estimating to reduce the computational load at various key points.

Since both the Lagrange Planetary equations and Hill' equations are orbit error equations relative to a nominal (broadcast ephemeris) orbit, these approaches implicitly assume that the orbit errors are linear. As a result these approaches tend to be valid only over short orbital arcs and are called orbital relaxation, as opposed to orbital estimation, approaches. Tables 6A–6C detail the orbit relaxation estimator 142 inputs, method and outputs.

TABLE 6A

| ORBIT RELAXATION ESTIMATOR INPUTS | | |
|---|---|---|
| $\delta x_k, \delta y_k, \delta z_k$ | = | orbit position error estimate for one SV (k'th epoch) |
| r | = | radius |
| u | = | corrected argument of latitude |
| $\Omega$ | = | corrected longitude of ascending node |
| I | = | corrected inclination |
| $t_k$ | = | kth time point (epoch) |
| A | = | semi-major axis |
| e | = | eccentricity |
| $E_k$ | = | eccentric anomaly |
| $\phi_k$ | = | argument of latitude |
| $C_{us}, C_{uc}$ | = | argument of latitude correction |
| $C_{rc}, C_{rs}$ | = | radius correction |
| $C_{ic}, C_{is}$ | = | inclination correction |

The second through last items in Table 6A are the broadcast ephemeris.

TABLE 6B

| ORBIT RELAXATION ESTIMATOR ALGORITHM | |
|---|---|
| $p_k = \begin{vmatrix} \delta x_k \\ \delta y_k \\ \delta z_k \end{vmatrix}$ | orbit position error vector for one $SV_k$ epoch |

TABLE 6B-continued
ORBIT RELAXATION ESTIMATOR ALGORITHM $$z = \begin{vmatrix} p_1 \\ p_2 \\ \cdot \\ \cdot \\ \cdot \\ p_k \end{vmatrix} \text{ general orbit position error vector for one SV}$$

$$[T_1]_k = \begin{bmatrix} a_{11} & -a_{12} & -a_{13} & a_{14} \\ a_{21} & -a_{22} & a_{23} & -a_{24} \\ a_{31} & -a_{32} & 0 & a_{34} \end{bmatrix}_k$$

where, $a_{11} = \cos u \cos \Omega - \sin u \cos I \sin \Omega$
$a_{12} = r [\sin u \cos \Omega + \cos u \cos I \sin \Omega]$
$a_{13} = r [\cos u \sin \Omega + \sin u \cos I \cos \Omega]$
$a_{14} = \sin u \sin I \sin \Omega$
$a_{21} = \cos u \sin \Omega + \sin u \cos I \cos \Omega$
$a_{22} = r [\sin u \sin \Omega - \cos u \cos I \cos \Omega]$
$a_{23} = r [\cos u \cos \Omega - \sin u \cos I \sin \Omega]$
$a_{24} = r \sin u \sin I \cos \Omega$
$a_{31} = \sin u \sin I$
$a_{32} = r \cos u \sin I$
$a_{34} = r \sin u \cos I$ $[T_2]_k =$ $$\begin{bmatrix} B_{11} & B_{12} & B_{13} & B_{14} & B_{15} & 0 & 0 & B_{18} & B_{19} & 0 & 0 & 0 & 0 & 0 & 0 \\ 0 & 0 & 0 & 0 & B_{25} & B_{26} & B_{27} & 0 & 0 & 0 & 0 & 0 & 0 & 0 & 0 \\ 0 & 0 & 0 & 0 & 0 & 0 & 0 & 0 & 0 & 0 & 0 & 0 & 0 & B_{3,14} & B_{3,15} \\ 0 & 0 & 0 & 0 & B_{45} & 0 & 0 & 0 & 0 & B_{4,10} & B_{4,11} & B_{4,12} & B_{4,13} & 0 & 0 \end{bmatrix}$$

where, $B_{11} = -A \cos E_k$ $B_{18} = B_{27} = B_{4,10} = \cos 2\phi_k$ $B_{12} = (1 - e \cos E_k)$ $B_{19} = B_{26} = B_{4,11} = \sin 2\phi_k$ $B_{13} = A \, e \, t_k / (1 - e \cos E_k)$ $B_{25} = (1 + 2 C_{us} \cos 2\phi_k - 2 C_{uc} \sin 2\phi_k)$ $B_{14} = A \, e \, \sin E_k / (1 - e \cos E_k)$ $B_{3,14} = B_{4,12} = 1$ $B_{15} = 2 (C_{rs} \cos 2\phi_k - C_{rc} \sin 2\phi_k)$ $B_{3,15} = B_{4,13} = t_k$ $B_{4,5} = 2 (C_{is} \cos 2\phi_k - C_{ic} \sin 2\phi_k)$ and, $[A']_k = [T_1]_k [T_2]_k$ $$[a] = \begin{vmatrix} A_1' \\ A_2' \\ \cdot \\ \cdot \\ \cdot \\ A_k' \end{vmatrix} \text{ orbit position error sensitivity matrix}$$

TABLE 6B (Continued)
ORBIT RELAXATION ESTIMATOR ALGORITHM $$x_2 = \begin{vmatrix} \delta e_o \\ \delta A_o \\ \delta n_o \\ \delta M_o \\ \delta \omega_o \\ \delta C_{us} \\ \delta C_{uc} \\ \delta C_{rc} \\ \delta C_{rs} \\ \delta C_{ic} \\ \delta C_{is} \\ \delta I_o \\ \delta \dot{I}_o \\ \delta \Omega_o \\ \delta \dot{\Omega}_o \end{vmatrix} = \{[a]^T [a]\}^{-1} [a]^T z$$

Orbit relaxation estimator 142

$e' = e + \delta e_o$
$A' = A + \delta A_o$
$\Delta n' = \Delta n + \delta n_o$
$M'_o = M_o + \delta M_o$
$\omega'_o = \omega_o + \delta \omega_o$ $C'_{us} = C_{us} + \delta C_{us}$
$C'_{uc} = C_{uc} + \delta C_{uc}$
$C'_{rc} = C_{rc} + \delta C_{rc}$
$C'_{rs} = C_{rs} + \delta C_{rs}$
$C'_{ic} = C_{ic} + \delta C_{ic}$
$C'_{is} = C_{is} + \delta C_{is}$
$I'_o = I_o + \delta I_o$
$\Omega'_o = \Omega_o + \delta \Omega_o$
$\dot{I}' = \dot{I} + \delta \dot{I}_o$
$\dot{\Omega}' = \dot{\Omega} + \delta \dot{\Omega}_o$ Corrected Broadcast Ephemeris Parameters

TABLE 6C
ORBIT RELAXATION ESTIMATOR OUTPUTS

| | | |
|---|---|---|
| $e'$, $\delta e_o$ | = | corrected eccentricity & correction |
| $A'$, $dA_o$ | = | corrected semi-major axis & correction |
| $\Delta n'$, $\delta n_o$ | = | corrected mean motion adjustment & correction |
| $M'_o$, $\delta M_o$ | = | corrected initial mean anomaly & correction |
| $\omega'_o$, $\delta \omega_o$ | = | corrected initial argument of perigee & correction |
| $C'_{us}$, $C'_{uc}$, $\delta C_{us}$, $\delta C_{uc}$ | = | corrected argument of latitude adjustments & corrections |
| $C'_{rc}$, $C'_{rs}$, $\delta C_{rc}$, $\delta C_{rs}$ | = | corrected radius adjustments & corrections |
| $C'_{ic}$, $C'_{is}$, $\delta C_{ic}$, $\delta C_{is}$ | = | corrected inclination adjustments & corrections |
| $I'_o$, $\dot{I}'$, $\delta I_o$, $\delta \dot{I}_o$ | = | corrected initial inclination, inclination rate, & corrections |
| $\Omega'_o$, $\dot{\Omega}'$, $\delta \Omega_o$, $\delta \dot{\Omega}_o$ | = | corrected initial longitude of right ascension, longitude rate of right ascension & corrections |

A network of thirty-three reference stations 12 distributed worldwide will satisfy a minimum requirement that each satellite 14 can be seen by at least five reference stations 12. This minimum number provides the raw measurements needed to obtain a high confidence position solution for each reference station 12, and averaged corrections improve with a wider base of measurements over which to spread the average. In addition, the density of the network is sufficient to tolerate a loss of two reference stations 12 and still meet a minimum visibility requirement of 99%.

The network of reference stations 12 transmits the ionospheric and tropospheric delay corrected GPS measurements to the CPF 16. In addition, the measured ionospheric delays are also transmitted to the CPF 16.

An important functional requirement for the network is that the density of reference stations 12 be sufficient such that each of the twenty-four operational SV's 14 can always be seen by at least five reference stations 12. This requirement stems from a need to eliminate unwanted reference receiver clock error, in addition to estimating SV clock error and three SV position error states.

Each reference station 12 should be housed in an environmental enclosure to protect it from precipitation and to control the internal temperature from any external temperature extremes, if reference station 12 is not located in a manned facility. The GPS antennas must be placed outside of the enclosure on a pre-surveyed site with unobstructed visibility to the GPS satellite constellation. Care should also be taken in the placement of these antennas to assure that there is a minimum of electromagnetic interference and a minimum of multipath reflection from nearby metallic surfaces or bodies of water.

TROPOSPHERIC DELAY CORRECTION

The tropospheric delay in the GPS measurements is an unwanted delay in the pseudorange and accumulated delta range data that is introduced by the troposphere. The delay, which is RF frequency-independent, typically introduces a delay of two meters for straight above head vertical (zenith) line-of-sight elevation angles. The delay increases to about twenty-five meters for line-of-sight elevation angles of 5°. The total delay consists of a dry and a wet component. The dry component accounts for about 90% of the total delay and the wet component accounts for the rest. While the dry component can be reasonably well modeled without any meteorological sensor data, the wet component requires measurements of the local weather conditions along the line-of-sight to satellite 14 for maximum accuracy. Typically, surface meteorological sensor measurements are extrapolated to the higher altitudes, using conventional atmospheric profiles.

Any of several tropospheric delay models can be used. The ideal algorithm provides the best worldwide accuracy, estimates both the dry and wet components and has the largest set of input variables. The algorithms with a large input variable set can be expected to provide better worldwide all-weather performance, over algorithms with a smaller input variable set. A comparison of these and other tropospheric delay models relative to ray-trace tropospheric delay estimates was performed by Janes, H. W., et al, in "Analysis of Tropospheric Delay Prediction Models: Comparisons with Ray-Tracing and Implications for GPS Relative Positioning (A Summary)", GPS'90, Ottawa, Canada, September 1990. It was determined that the Saastemoinen zenith delay model combined with the Davis mapping function and the Goad and Goodman water vapor algorithm is a model to be preferred. The principal inputs to the tropospheric delay model are temperature, pressure and relative humidity measurements from the meteorological sensor module 48. The relative humidity is then converted to water vapor pressure, which is used together with the temperature and pressure measurements to determine the tropospheric zenith delay. Line-of-sight elevation angles, are also needed from GPS receivers 30 and 32. In addition the geodetic latitude and altitude of the GPS antenna is required, which are established at the time the antenna for GPS receivers 30 and 32 is surveyed at its permanent location. This data is then used to determine the tropospheric delay mapping function as well as the standard gravity correction in the zenith delay model.

IONOSPHERIC DELAY CORRECTION

The ionized components of the atmosphere, which extend from about fifty kilometers high to 1,000 kilometers, will introduce delays in RF signals that vary inversely as the square of the RF frequency. At GPS L1 and L2 frequencies, the delays can approach fifty meters for low elevation angle lines-of-sight. The delay slows down the pseudorange (code) measurement and advances the accumulated delta range (carrier) measurement. The ionosphere has a variable total electron count (TEC) that determines the extend of the delay. The TEC is variable with respect to local time and the geomagnetic latitude. In addition to daily (diurnal) variations, ionospheric delay varies with the month of the year and the eleven year solar sunspot cycle. Ionospheric delay is practically unpredictable in the polar regions, around the equator and everywhere during solar storms.

P-code reference receivers are needed for reference stations 12 because they have the ability to use dual-frequency measurements to find the ionospheric delay directly, using a simple algorithm that only depends on the carrier frequencies of and the time delay between the two measurements.

For C/A code receivers, the Navigation Message (NAV) from each GPS satellite contains a model for the ionospheric delay that was developed by Klobuchar. The Klobuchar model is a fit to the more extensive Bent model, which is based on a comprehensive data base of worldwide ionospheric measurements. The Klobuchar model fit is best in the northern hemisphere and in particular, in the mid-latitudes over the continental United States. It is formulated as a truncated four parameter cosine model and includes a night time bias, an amplitude (four coefficient polynomial), a constant phase and a period (four coefficient polynomial). These ten coefficients, which are included in the Navigation Message, are based on monthly averages. It is estimated that a broadcast ionospheric delay model corrects for about 50% to 60% of the total ionospheric delay.

The inputs to the ionospheric group delay algorithm, above, are pseudorange measurements from the L1 and L2 channels, in addition to the accumulated delta range. The algorithm computes the ionospheric delay along the line-of-sight to each of the SV's in view. The ionospheric delays are removed from the pseudorange error estimates and are also sent to CPF 16, separately.

FAILURE DETECTION AND ISOLATION ALGORITHM

Both receivers 30 and 32 operate at the same time with one receiver designated as a lead, or primary, receiver. The measured data from both receivers 30 and 32, as well as additional data, such as signal strength, is fed to failure detection and isolation algorithm 88. The algorithm will check the integrity of the data being collected by the lead receiver. If the integrity of the data from the receiver is in question, the data is flagged to CPF 16, which may then elect to switch to the backup receiver 32, using a command link from CPF 16 to reference station 12.

REFERENCE RECEIVER

In an experiment conducted by the inventors, a dual-frequency, unauthorized P-code survey receiver was selected. Originally a twenty-channel receiver was selected as the nominal receiver, since it provides ten channels of tracking on each frequency. A Monte Carlo simulation was done to examine the number of operational SV's visible to a reference receiver located anywhere in the world. For a 10° mask angle, no more that eight SV's are visible 99% of the time. Thus, a sixteen-channel receiver is adequate and can be used as the preferred reference station receiver. In building an error budget for reference station 12, some measurements will exhibit an accuracy that varies between 0.6 meters for zenith line-of-sight measurements and 1.5 meters for line-of-sight measurements at a 10° elevation angle. A decision to use unauthorized P-code receivers should be based on understanding that P-code is encrypted (Y-code) only intermittently.

A full Y-code GPS receiver is available to classified military users only. An unauthorized full P-code receiver has a full-wavelength codeless tracking mode as a backup. An example of that type of receiver is the Rogue SNR-8 receiver that reverts to a codeless cross-correlation tracking mode when Y-code is turned on. Other full P-code receivers can revert to codeless tracking mode based on squaring the L2 channel, for example, the Ashtech P-12 receiver. An L2 P-code receiver reverts to a codeless tracking mode based on squaring the L2 channel. The Trimble Geodetic Surveyor IIP is an example of that type of receiver. The Trimble Geodetic Surveyor II is an example of dual-frequency, receiver that lacks P-code and tracks the L2 channel by squaring the channel. The agreement in the delays between a P-code and a codeless tracking mode is good for elevation angles higher than 30° and deteriorates for the lower elevation angles for the codeless tracking mode. When using carrier phase derived delays as a reference for the code delays, good agreement exists between the code and carrier delays when a receiver is operating in the P-code tracking mode. Code delays deteriorate for the lower elevation angles when the receiver is operating in the codeless tracking mode. It can be concluded that the absolute L1-L2 delay are obtained, whether a receiver is operating in the full P-code or the codeless tracking mode. However, in a codeless tracking mode, the L1-L2 delay becomes noisier for the lower elevation angle measurements. This stems from the fact that P-code tracking loops use a receiver generated noiseless reference signal to decode the received P-code signals when not encrypted. In the codeless cross-correlated tracking mode of the receiver, the unknown P-code signal on one frequency is used as a noisy reference signal for the unknown P-code signal on the second frequency to obtain the relative P-code delay, without decoding the unknown P-code signals.

The choice of what receiver type to select is a complex one. The receiver type that may be adequate for a test reference receiver, which is checked in a non-Y Code environment, but it may not be adequate for an operational reference receiver. Also, the GPS receiver technology is still evolving such that a receiver selected as reference receiver may be outdated by the time an operational worldwide differential GPS network 10 can be implemented.

METEOROLOGICAL SENSOR

Meteorological sensor measurements are required to estimate a "wet" component of the tropospheric delay, which accounts for about 10% of the total tropospheric delay. While more sophisticated sensor packages can be selected to measure the tropospheric delay directly along the line-of-sight to each SV, surface measurements of temperature, pressure and relative humidity are good enough for the operational reference station 12. The preferred tropospheric delay algorithm extrapolates these surface measurements through the troposphere using standard atmospheric profiles. A generic meteorological sensor module 48 could be assembled by purchasing the individual sensors and the data acquisition hardware and software components and integrating these into a custom module. The sensor voltages, from the temperature, pressure and relative humidity sensors are preferably low-pass filtered, to remove any noise. These filtered voltages are then digitized to obtain the raw pressure, temperature and relative humidity measurements, in engineering units. Since the pressure and relative humidity sensors are temperature-sensitive, they must be corrected for any temperature-caused errors, unless the sensors are temperature controlled. The corrected meteorological measurements are then passed to the tropospheric delay correction algorithm 82.

An alternative solution to assembling a custom meteorological sensor module 48 is to select a portable weather station with sensors of the required accuracies. An error budget for the tropospheric delay compensation hardware and software should be based on the quoted accuracies of the algorithm and a linear error analysis for the algorithm to establish the sensor accuracy requirements. The limiting accuracy is due to the mapping function at low elevation angles. Thus, sensors that are more accurate than the mapping function are not needed. Based on this, pressure and temperature sensors with an accuracy of 1% to 2% each and relative humidity sensors with an accuracy of 5% to 10% should be adequate for use in meteorological sensor system 48. A 1% pressure sensor has a 10 millibar (mb) uncertainty and a 1% temperature sensor has a 5° Fahrenheit (F) uncertainty relative to absolute zero. Other factors that need to be considered are the environmental specifications, the robustness of the design and hardware and the amount of testing that has been done.

REFERENCE PROCESSOR

Reference station microprocessor 74 hosts the tropospheric and the ionospheric delay algorithms 82 and 84 and communications software 90. A 286-type IBM-AT compatible personal computer or clone can be used for microcomputer 74. The ionospheric delay algorithm 84 and possibly the tropospheric delay algorithm 82 can be installed as firmware in the reference receiver processor. A principal function of microprocessor 74, is to host failure detection and isolation software 88, in addition to any communications software 90.

NETWORK COMMUNICATIONS SYSTEM

A key function of the network communications system comprising datalinks 19 and satellites 18 is to transmit the measurements from the worldwide network of reference stations 12 to CPF 16 accurately and with minimum latency at a minimum of cost. The communications system must also permit control of remote, unattended reference stations 12 by CPF 16. Because of the worldwide distribution of reference stations 12, the satellite communications datalink 19 is required. The International Telecommunications Satellite Organization (INTELSAT) is able to provide the digital data service required. The service uses the inexpensive Very Small Aperture Terminals (VSAT's) and is fully interactive. Both "Ku" and "C" band transponders with global and hemispherical beams are available. Bandwidth allocations of up to 72 MHz are also available. A link 19 from each reference station 12 to CPF 16 is preferably a full-time, non-preemptive lease from INTELSAT. The use of the INTELSAT service requires the use of three INTELSAT communications satellites, in order to obtain the necessary global coverage. Since CPF 16 will probably not be able to simultaneously communicate with all three INTELSAT satellites, feeder links (or alternately multiple central processing facilities 16) may be necessary. In case a primary VSAT communications link 19 is lost, a second (backup) satellite communications link is a good idea. The first choice for the backup link is a second INTELSAT service using different satellites. The same VSAT's could be used for both the primary and the secondary link, in that case. The secondary link is not necessarily required on a full-time basis. An alternative backup satellite link could comprise the International Maritime Satellite Organization (INMARSAT) Standard "A" or Standard "C" service. For reference stations 12 located in areas that offer a public switched telephone system, such a system can be used as a backup land-line communications system, as in landlines 24.

A number of communications link performance issues need to be considered. Two key issues are the minimum latency of the received data and the data integrity. While there is some transmission delay of network data over the satellite links 19, the use of a global system of reference stations 12 needing to communicate with a single CPF 16 imposes a requirement to use a satellite communication system. If the delay is a critical issue, multiple CPF's 16 can be used, instead. Data integrity in transmitting the data over the communications links 19 are assured by redundant communications link interface hardware at reference stations 12 and CPF 16 (e.g., through the use of redundant VSAT's 18). It can also be improved by reliable protocols and an insensitivity of the communications signals to weather.

Since usage cost is a very important operational factor, tradeoffs need to be made between data volume versus usage costs. Data volume is reduced by selecting only key data for transmission, by using data compression techniques (such as truncating the data accuracy to that actually required), and by using mixed data rates.

REFERENCE STATION COMMUNICATIONS LINK SOFTWARE

A key function of reference station 12 communications link software 90 is to format reference station 12 data to be sent to CPF 16 in messages for transmission over the communications link 19 Formatting includes a proper scaling or truncation of the data from reference station 12, in addition to a scheduling of data that is transmitted at different data rates. The software 90 must also decompress or decode control messages received from CPF 16. The signal-to-noise ratio is included to check the health of the SV 14, as well as to monitor any multipath signal. If any data is bad and outside its nominal dynamic range, it is sent to CPF 16 after having been scaled.

The Navigation Message includes the broadcast ephemeris, while the issue of data ephemeris (IODE), identifies the age of that ephemeris. Only one Navigation Message is required from each SV114 from the whole network. Since each SV 14 is tracked by seven reference stations 12, there would otherwise be a seven-fold duplication of Navigation Messages, if each reference station 12 sends the Navigation Message from all SV's in view. Thus, to assure that only one set is sent for each SV, CPF 16 could request specific reference stations 12 to send the Navigation Message from specific SV's 14. Alternately, a protocol can be set up so that each reference station 12 sends back the Navigation Message for any SV 14 that has a local elevation angle above some minimum value.

DATA TRANSMISSION REQUIREMENTS

Data transmission requirements dictate the required communications link 19 bandwidth. The bandwidth estimate for the data to be sent between reference station 12 and CPF 16 are derived from the number of bits of data that need to be sent, multiplied by the required sampling frequency for the data. It is possible to estimate the communications bandwidth required to transmit the data from reference station 12 to CPF 16. For eight SV's 14 being tracked at each reference station 12, approximately 600 bps is required, including a 300 bps overhead to allow for headers, parity bits, etc. The total does not include the Navigation Message, at fifty bps, for those eight SV's. Only twenty-four Navigation Messages need to be transmitted from a network of thirty-three reference stations 12, which is less than one Navigation Message, at fifty bps, per reference station 12. Control messages are sent back to reference station 12 by CPF 16. Approximately twenty-one kbps of data is received by CPF 16 from the thirty-three reference stations 12. The total includes the Navigation Messages for the 24 SV's. About 9.9 kbps of command and control bandwidth are sent by CPF 16 back to the thirty-three reference stations 12.

CPF COMMUNICATIONS LINK SOFTWARE

The principal function of CPF 16 communications link 19 software 90 is to receive and decode the data sent from the thirty-three reference stations 12 and to format command and control messages back to the individual remote reference stations 12. Due to the volume of data, a key issue is how to schedule the arrival of the data from the Network without data collisions or loss of data. While this is not an issue for the prototype CPF 16, it is an issue that requires additional analysis for the operational system.

In FIG. 8, a special message 150 is constructed by broadcast software 114 to economize in the volume of data placed on datalinks 20. CPF 16 produces a Radio Technical SC-104 format Type 25 message to supplement pseudorange corrections (PRC) transmitted in Type 1 messages. In system 10, the PRC's in the Type 1 message apply to a user 22 located at coordinates that are transmitted in a Type 3 message to CPF 16 by user 22 over datalink 20. The correction applicable to a user 22 is:

$$PRC = PRC_{T1} + (lat_u - lat_{T3}) \cdot pLat_{T25} + (lon_u - lon_{T3}) \cdot pLon_{T25}$$

where, $PRC_{T1}$ is the PRC from the Type 1 message in meters, $lat_u$ and $lon_u$ are the latitude and longitude of the user 22 in radians, $lat_{T3}$ and $lon_{T3}$ are the position from Type 3, $pLat_{T25}$ and $pLon_{T25}$ are the latitude and longitude correction factor from Type 25 in meters per radian. FIG. 8 shows the configuration of special message 150, which comprises a thirty-bit word 152 containing 24 bits for a header word one and a six bit parity; a thirty-bit word 154 containing 24 bits for a header word two and a six bit parity. A block for a first satellite 16 comprises a thirty-bit word 156 containing three bits of fill, five bits of satellite identification, sixteen bits of Type 25 latitude correction factor in meters per radian; a thirty-bit word 158 containing six bits for issue of data, sixteen bits of Type 25 longitude correction factor in meters per radian. A variable number of blocks each containing a pair of words 160 and 162 follow and are similar to words 156 and 158, respectively. An "$n^{th}$" block containing a pair of words 164 and 166 comprises a thirty-bit word 156 containing three bits of fill, five bits of "$n_{th}$" satellite identification, sixteen bits of Type 25 latitude correction factor in meters per radian; a thirty-bit word 158 containing six bits for issue of data, sixteen bits of Type 25 longitude correction factor in meters per radian.

CENTRAL PROCESSING FACILITY

A primary function of CPF 16 is to take the ionospherically and tropospherically corrected measurements from the reference stations 12 and estimate the SV clock and ephemeris errors. The unknown reference receiver clock errors are not corrected for, but rather are considered nuisance variables that are removed in the preprocessing stage prior to the estimation of these SV errors. (The variable is removed by estimating the SV clock.) Another function of CPF 16 is to provide a filtered estimate of the ionospheric delay for users 22 that do not have dual-frequency GPS receivers. The ionospheric estimate is based on an ionospheric filter or estimation algorithm that uses the dual-frequency GPS reference receiver ionospheric measurements transmitted to CPF 16 from reference stations 12.

Since reference stations 12 are at remote locations and are usually to be unattended, another function of CPF 16 is to query the status of reference stations 12. If needed, CPF 16 will then send a required command to the remote receivers.

EXTERNAL INTERFACES

Principal inputs to CPF 16 are reference station 12 measurements that have been received over the communication system. As required, CPF 16 will also assert control over the remote unattended reference stations 12 via the communication system. As shown in FIGS. 2 and 3, the communication system interface uses a VSAT both for a primary and the backup interface. A land line interface is also provided as another backup interface, where the interface are implemented.

CPF 16 interfaces with a user 22 over datalink 20. The specific form of the interface depends on the specific user. However, as discussed above, the interface also includes the option for VSAT's and land line communications interfaces. Users 22 receive the SV clock and ephemeris corrections, the ionospheric delay model estimates and SV integrity information.

SV ORBIT ESTIMATOR STABILITY CHECKS

Estimates obtained from orbit estimator 104 are checked for stability of the filter solution. This includes checks done on the least-squares residuals to determine that there are no significant biases in these residuals. Other checks should also be done, as required.

SV CLOCK ESTIMATOR

SV clock estimator 106 is presented in FIG. 6. Tables 7A–7C show the inputs, method and outputs of SV clock estimator 106. The algorithm uses carrier-smoothed pseudorange errors, which have been corrected for tropospheric delays, ionospheric delays and SV orbit errors. These adjusted pseudorange errors from all the reference stations 12 at the same epoch are stacked together to form a measurement vector, Z. A state vector b is formulated that includes the reference receiver clock errors on top and SV 14 clock errors on the bottom. To remove unwanted reference receiver clock errors, a difference operator $[D_{CE}]$ is used. Use of the matrix on the measurement matrix $[F]$ which consists of the partial derivatives of the pseudorange errors with respect to the reference receiver clock errors, eliminates the matrix $[D_{CE}][F] = 0$. Following the operation, a least-squares estimator is used to estimate SV 14 clock errors, $\delta T$, for all the SV's, using the corrected measurement vector z.

TABLE 7A

| SV CLOCK ESTIMATOR INPUTS | | |
|---|---|---|
| $\rho_{ij} = \rho_k$ | = | ionospheric-free pseudorange |
| $R_i$ | = | i'th reference station position vector |
| $e_{ij}$ | = | line-of-sight unit vector (station$_i$, SV$_j$) |
| $M_{11}$ | = | measurement noise (diagonal) variance |
| $e'$ | = | corrected eccentricity |
| $A'$ | = | corrected semi-major axis |
| $\Delta n'$ | = | corrected mean motion adjustment |
| $M'_o$ | = | corrected initial mean anomaly |
| $\omega'_o$ | = | corrected initial argument of perigee |
| $C'_{us}, C'_{uc}$ | = | corrected argument of latitude adjustments |
| $C'_{rc}, C'_{rs}$ | = | corrected radius adjustments |
| $C'_{ic}, C'_{is}$ | = | corrected inclination adjustments |
| $I'_o$ | = | corrected initial inclination |
| $i'$ | = | corrected inclination rate adjustment |
| $\Omega'_o$ | = | corrected initial longitude of right ascension |
| $\dot{\Omega}'$ | = | corrected longitude rate of right ascension |
| $\mu$ | = | WGS84 value of earth's universal gravitational parameter |
| t, $t_{oe}$ | = | GPS system time at transmission & ephemeris reference epoch |
| $\Omega_e$ | = | WGS84 value of earth's rotation rate |

TABLE 7B

| SV CLOCK ESTIMATOR ALGORITHMS |
|---|
| Corrected Ephemeris Calculations |

TABLE 7B-continued

SV CLOCK ESTIMATOR ALGORITHMS $n' = \sqrt{\dfrac{\mu}{(A')^3}} + \Delta n'$  corrected mean motion $t_k = t - t_{oe}$  time from ephemeris reference epoch $M'_k = M'_o + t_k n'$  corrected mean anomaly $E'_k = M'_k + e' \sin E'_k$  corrected eccentric anomaly Solve iteratively for $E'_k$ with initial estimate for $E'_k = M'_k$, on right side of equation.

$f_k = \arctan\left\{ \dfrac{\sqrt{1 - e'^2} \sin E'_k}{\cos E'_k - e'} \right\}$  corrected true anomaly $\phi'_k = f_k + \omega'_o$  corrected argument of latitude $\Delta u'_k = C'_{us} \sin 2\phi'_k + C'_{uc} \cos 2\phi'_k$  corrected argument of latitude adjustment $\Delta r'_k = C'_{rc} \cos 2\phi'_k + C'_{rs} \sin 2\phi'_k$  corrected radius adjustment $\Delta I'_k = C'_{ic} \cos 2\phi'_k + C'_{is} \sin 2\phi_k$  corrected inclination adjustment $u'_k = \phi'_k + \Delta u'_k$  corrected argument of latitude $r'_k = A'[1 - e' \cos E'_k] + \Delta r'_k$  corrected radius $I'_k = I'_o + \Delta I'_k + t_k \dot{I'}$  corrected inclination $\Omega'_k = \Omega'_o + t_k \dot{\Omega'}_o - t \dot{\Omega}_e$  corrected longitude of ascending node $x'_k = r'_k [\cos u'_k \cos \Omega'_k - \sin u'_k \cos I'_k \sin \Omega'_k]$  corrected $y'_k = r'_k [\cos u'_k \sin \Omega'_k + \sin u'_k \cos I'_k \cos \Omega'_k]$  SV position $z'_k = r'_k \sin u_k \sin I'_k$  (earth-fixed)

$R'_j = \begin{vmatrix} x'_k \\ y'_k \\ z'_k \end{vmatrix}$

SV CLOCK ESTIMATION CALCULATIONS $\Delta \rho'_{ij} = \rho_{ij} - [R_i - R'_j]^T e_{ij}$ corrected pseudorange error Set up SV clock sensitivity [G] matrix based on SV's tracked by each reference station.

e.g.: If the first reference station saw PRN's: 1, 4, ... , 21; the second saw 3, 4, ... 21; and the 33rd saw: 6, ..., 24; then the [G] matrix looks as follows:

[G] =

$$\begin{bmatrix} -1 & 0 & 0 & 0 & 0 & 0 & 0 & \ldots & 0 & 0 & 0 & 0 & 0 \\ 0 & 0 & 0 & -1 & 0 & 0 & 0 & \ldots & 0 & 0 & 0 & 0 & 0 \\ \cdot & \cdot & \cdot & \cdot & \cdot & \cdot & \cdot & & \cdot & \cdot & \cdot & \cdot & \cdot \\ 0 & 0 & 0 & 0 & 0 & 0 & 0 & \ldots & 0 & -1 & 0 & 0 & 0 \\ 0 & 0 & -1 & 0 & 0 & 0 & 0 & \ldots & 0 & 0 & 0 & 0 & 0 \\ 0 & 0 & 0 & -1 & 0 & 0 & 0 & \ldots & 0 & 0 & 0 & 0 & 0 \\ \cdot & \cdot & \cdot & \cdot & \cdot & \cdot & \cdot & & \cdot & \cdot & \cdot & \cdot & \cdot \\ 0 & 0 & 0 & 0 & 0 & 0 & 0 & \ldots & 0 & -1 & 0 & 0 & 0 \\ \cdot & \cdot & \cdot & \cdot & \cdot & \cdot & \cdot & & \cdot & \cdot & \cdot & \cdot & \cdot \\ 0 & 0 & 0 & 0 & 0 & 0 & 0 & \ldots & 0 & 0 & 0 & 0 & -1 \end{bmatrix}$$

$\quad\; 1 \;\; 2 \;\; 3 \;\; 4 \;\; 5 \;\; 6 \;\; 7 \;\ldots\; 20\; 21\; 22\; 23\; 24$ PRN's $Z = \begin{vmatrix} \Delta \rho'_{11} \\ \Delta \rho'_{12} \\ \cdot \\ \Delta \rho'_{ij} \\ \cdot \\ \Delta \rho'_{33,j} \end{vmatrix}$ measurement vector at epoch $t_k$ $[D_{CE}] =$ $$\begin{bmatrix} \dfrac{1}{\sqrt{2M_{11}}} & \dfrac{-1}{\sqrt{2M_{22}}} & 0 & 0 & \ldots & 0 \\ \dfrac{1}{\sqrt{6M_{11}}} & \dfrac{1}{\sqrt{6M_{22}}} & \dfrac{-2}{\sqrt{12M_{33}}} & 0 & \ldots & 0 \\ \dfrac{1}{\sqrt{12M_{11}}} & \dfrac{1}{\sqrt{12M_{22}}} & \dfrac{1}{\sqrt{12M_{33}}} & \dfrac{-3}{\sqrt{12M_{44}}} & \ldots & 0 \\ \ldots & \ldots & \ldots & \ldots & & 0 \\ \dfrac{1}{\sqrt{I(I-1)M_{11}}} & \ldots & \ldots & \ldots & \ldots & \dfrac{-(I-1)}{\sqrt{I(I-1)M_{11}}} \end{bmatrix}$$

$z = [D_{CE}] Z$
$[G'] = [D_{CE}] [G]$ $\delta T = \begin{vmatrix} \delta T_1 \\ \delta T_2 \\ \cdot \\ \cdot \\ \delta T_{24} \end{vmatrix} = \{[G']^T [G']\}^{-1} [G']^T z$ SV Clock Estimator

TABLE 7C

SV CLOCK ESTIMATOR OUTPUTS

| | | |
|---|---|---|
| $t_k$ | = | epoch |
| $\delta T$ | = | SV clock corrections at the epoch |
| $R'_j$ | = | corrected $SV_j$ position at the epoch |

SV CLOCK ESTIMATOR STABILITY CHECKS

The results of SV clock estimator 106 are checked to assure a stable solution. This will probably include a check of the least-squares estimator residuals to check for whiteness or lack of any significant biases.

IONOSPHERIC MODEL ESTIMATOR

The function of the ionospheric model estimator 116 is to provide ionospheric delay estimates for any civilian user who is using a single-frequency GPS receiver and wishes to obtain better accuracy than obtained with the broadcast ionosphere model, the Klobuchar Model. Tables 8A-8C show the inputs, methods and output of ionospheric model estimator 116.

In its simplest form, the ionospheric delay can be characterized in terms of a zenith delay and an obliquity factor, or mapping function, which translates the zenith delay to non-vertical lines-of-sight from the user to SV 14 being tracked.

Klobuchar formulated a model of the ionospheric delay which uses a zenith delay that is a truncated cosine function. It also uses a mapping function that depends only on the line-of-sight elevation angle and assumes that the ionosphere is concentrated in a shell at a fixed altitude of 350 kilometers. The four principal parameters used to describe the Klobuchar model are: a night time bias (DC) and a day time amplitude that is multiplied by a cosine function that has a period and a phase. Klobuchar selected the order of the polynomial for these four parameters. Thus, he selected a night time bias (0'th order polynomial) that might have been more accurately represented with a fourth order polynomial. Klobuchar approximated the day time amplitude with a fourth order polynomial. Klobuchar selected a constant phase of 1,400 hours, although a fourth order polynomial is more accurate. Klobuchar selected a fourth order polynomial for the period, although a higher order polynomial can be more accurate. Klobuchar represented the cosine function as a four-term series expansion, rather than using the cosine function itself or considering higher order terms. The reason for making these approximations were dictated, in part, by the desire to keep the broadcast ionosphere model relatively simple for the single-frequency user as well as to minimize the amount of data to be sent over the GPS navigation message.

A summary of some of the more sophisticated global ionospheric models indicates whether the electron profile and the integrated electron profile, or TEC, is available in these models. It also shows the input variables that the models accept; hopefully the more variables that are input, the more accurate the solution that is obtained. The ITS-78, IONCAP and Bradley models cannot be used for the ionospheric model estimator 116 since these models do not extend completely through the ionosphere. Of the remaining models, the Bent and IRI-86, International reference Ionosphere of 1986, are the preferred models. The recently released update to the IRI-86 model, the IRI-90 model, may also be considered.

There are a number of options open for enhancing the broadcast ionospheric delay model. The ten parameters used in the Klobuchar model can be estimated directly. Better accuracy can probably be achieved since hourly measurements can be used rather than monthly averages to determine these parameters. Another option consists of estimating perturbations, in the form of a bias and a scale factor, to the broadcast model. Finally, another option is to use higher order expansions for the four parameters of the Klobuchar model as well as to evaluate the cosine function directly, rather than using the truncated Taylor series expansion. While all of these approaches have their merits, they are all limited by the fact that the cosine model used is inherently not accurate enough.

Another approach is to use the Bent model in various ways. The Bent model appears to be too complex to be used as a real-time model. Since the IRI-86 model is of comparable accuracy and is reputed to be less computationally complex, the model and its revision (IRI-90) are good candidates for use as ionospheric model estimator 116. The preferred approach is based on deriving a contour VTEC map, using the dual-frequency ionospheric delay measurements at reference stations 12. In its simplest level, the dual-frequency ionospheric measurements are rotated to the equivalent local (sub-ionospheric shell penetration of the line-of-sight) zenith delay. These zenith delays are then fit to a two-dimensional surface for the whole globe. A mapping function, as well as regional values of that zenith delay surface are then incorporated by user 22 to determine its line-of-sight ionospheric delays. The specific ionospheric delay model equation for the preferred approach is:

$$D_1(\tau,\lambda,h_I) = \frac{D_{IZ}(\tau,\lambda)}{\sqrt{1 - \left|\frac{[R_E \cos(\epsilon)]^2}{[R_E + h_{IO}]^2}\right|}} \left\{ 1 - \Delta h_1(\tau,\lambda) \left| \frac{\frac{[R_E \cos(\epsilon)]^2}{[R_E + h_{IO}]^3}}{1 - \left|\frac{[R_E \cos(\epsilon)]^2}{[R_E + h_{IO}]^2}\right|} \right| \right\}.$$

The empirical model uses either a two-dimensional polynomial expansion, or alternately, a two-dimensional Fourier series in terms of geomagnetic latitude and local time. The mapping function is also approximated using a first order Taylor series about the nominal ionospheric altitude. The variability of the ionospheric altitude can be expressed either as a two-dimensional polynomial expansion or as a two-dimensional Fourier series in geomagnetic latitude and local time. Dual-frequency measurements are used in the equation to derive the unknown coefficients of the zenith delay and ionospheric altitude variation.

A closer look at the candidate ionospheric delay model indicates that the estimation problem is still nonlinear. This arises from the fact that the zenith delay expansion and altitude variation expansions occur as a product. The unknown coefficients, however, can be estimated iteratively. Specifically, the zenith coefficients are estimated first, assuming the altitude variation is negligible. Next, using the initial estimate of the zenith delay, the altitude effect is estimated. The results of the first pass are then compared to the raw measurements and the residuals are checked to see if another iteration is required.

While the model is driven directly by the dual-frequency measurements, a reference model, such as the IRI-90 model can be employed during a startup phase to select either the polynomial or the Fourier series expansions as well as to determine the order of these expansions.

TABLE 8A

| GLOBAL IONOSPHERIC DELAY MODEL INPUTS | | |
|---|---|---|
| $\Delta P_{IONOij}$ | = | measured line-of-sight ionospheric delay (station$_i$, SV$_j$) |
| $\lambda_i, \theta_i$ | = | latitude and longitude of i'th reference station |
| $\epsilon_{ij}, \alpha_{ij}$ | = | station$_i$ - SV$_j$ line-of-sight elevation and azimuth angle |
| $T_{GPS}$ | = | GPS time |
| $h_{Io}$ | = | nominal (thin shell model) ionospheric altitude |
| $\lambda_M, \theta_M$ | = | latitude and longitude of geomagnetic north pole |

TABLE 8A-continued
GLOBAL IONOSPHERIC DELAY MODEL INPUTS

| | | |
|---|---|---|
| $R_E$ | = | spherical earth radius |
| I, J(I) | = | number of stations & number of SV's observed at station$_i$ |
| N, M | = | zenith ionospheric delay expansion limits with respect to normalized local time and local geomagnetic latitude |
| L, K | = | ionospheric altitude variation expansion limits with respect to normalized local time and local geomagnetic latitude |
| $C_{mean}$, $C_{rms}$ | = | ionospheric model mean and rms residual convergence test limits |

TABLE 8B
GLOBAL IONOSPHERIC DELAY MODEL ALGORITHM

Calculate Independent Variables $\Delta h_{Iij} = 0$ initial estimate of ionospheric altitude variation
$h_{Iij} = h_{Io} + \Delta h_{Iij}$ local (subionic) ionospheric altitude
$A_{ij} = (90° - \epsilon_{ij}) - \sin^{-1}\{(R_E \cos \epsilon_{ij})/(R_E + h_{Iij})\}$ central earth angle: site − subionic point (deg)
$\lambda_{Iij} = \sin^{-1}\{\sin \lambda_i \cos A_{ij} + \cos \lambda_i \sin A_{ij} \cos a_{ij}\}$ local (subionic) geocentric latitude
$\theta_{Iij} = \theta_i + \sin^{-1}\{\sin A_{ij} \sin a_{ij}/\cos \lambda_{Iij}\}$ local (subionic) longitude
$\lambda_{ij} = \sin^{-1}\{\sin \lambda_{Iij} \sin \lambda_M + \cos \lambda_{Iij} \cos \lambda_M \cos(\theta_{Iij} - \theta_M)\}$ local (subionic) geomagnetic latitude
$t_{ij} = 240 \theta_{Iij} + T_{GPS}$ local time $$\tau_{ij} = \begin{cases} \dfrac{t_{ij}}{240} & 0 < \tau_{ij} < 86{,}400 \\ \dfrac{(t_{ij} - 86{,}400)}{240} & \tau_{ij} > 86{,}400 \\ \dfrac{(t_{ij} + 86{,}400)}{240} & \tau_{ij} < 0 \end{cases}$$

for normalized local time.

$$D_I = \begin{vmatrix} \Delta P_{IONO1,1} \\ \Delta P_{IONO1,2} \\ \vdots \\ \Delta P_{IONOi,j} \\ \vdots \\ \Delta P_{IONOSPHERIC\,I,J(I)} \end{vmatrix} \quad \text{line-of-sight measured ionospheric delay vector}$$

IONOSPHERIC ZENITH DELAY ESTIMATOR (POLYNOMIAL/FOURIER SERIES)

$$B_{ij} = \frac{1}{\sqrt{1 - \left[\dfrac{(R_E \cos \epsilon_{ij})^2}{(R_E + h_{Io})^2}\right]}} \quad \text{nominal mapping function}$$

$[S]_Z =$

-continued $$\Delta h_I(\tau,\lambda) = \sum_{l=0}^{L} \sum_{k=0}^{K} a_{h1k} \tau^l \lambda^k$$

previous (polynomial) estimate of ionospheric altitude variation from nominal, or $$\Delta h_I(\tau,\lambda) = a_{h00} + \sum_{k=1}^{K} [a_{h0k} \cos(2k\lambda) + a_{h0,K+k} \sin(2k\lambda)] +$$

$$\sum_{l=1}^{L} \begin{bmatrix} a_{h10} \cos(1\tau) + \\ a_{hL+1,0} \sin(1\tau) \end{bmatrix} +$$

$$\sum_{l=1}^{L} \sum_{k=1}^{K} \begin{bmatrix} a_{h1k} \cos(1\tau)\cos(2k\lambda) + \\ a_{hL+1,K+k} \cos(1\tau)\sin(2k\lambda) + \\ a_{h2L+1,2K+k} \sin(1\tau)\cos(2k\lambda) + \\ a_{h3L+1,3K+k} \sin(1\tau)\sin(2k\lambda) \end{bmatrix}$$

previous (Fourier series) estimate of ionospheric altitude variation from nominal.
For initial pass, $\Delta h_I = 0$ $$C_{ij} = \left\{ 1 - \frac{\Delta h_I(\tau_{i,j},\lambda_{ij}) \left[\dfrac{(R_E \cos \epsilon_{ij})^2}{(R_E + h_{IO})^3}\right]}{1 - \left[\dfrac{(R_E \cos \epsilon_{ij})^2}{(R_E + h_{IO})^2}\right]} \right\}$$

off-nominal ionospheric altitude scaling coefficient $$[C] = \begin{bmatrix} B_{11}C_{11} & 0 & 0 & . & 0 & . & 0 \\ 0 & C_{12}B_{12} & 0 & . & 0 & . & 0 \\ . & & & . & . & & . \\ 0 & 0 & 0 & . & C_{IJ}B_{ij} & . & 0 \\ . & & & . & . & & 0 \\ 0 & 0 & 0 & . & 0 & . & C_{I,J(I)}B_{I,J(I)} \end{bmatrix}$$

scaling matrix (Matrix $[S]_z$, below, is too wide to fit across the page, and so is split into two sections ...)

$$[S]_Z = \begin{bmatrix} 1 & \lambda_{11} & \lambda^2_{11} & . & \lambda^M_{11} \\ 1 & \lambda_{12} & \lambda^2_{12} & \ldots & \lambda^M_{12} \\ . & . & . & . & . \\ 1 & \lambda_{I,J(I)} & \lambda^2_{I,J(I)} & . & \lambda^M_{I,J(I)} \end{bmatrix}$$

$$\begin{bmatrix} \tau_{11} & . & \tau^N_{11} & \tau_{11}\lambda_{11} & . & \tau^N_{11}\lambda^M_{11} \\ \tau_{12} & . & \tau^N_{12} & \tau_{12}\lambda_{12} & . & \tau^N_{12}\lambda^M_{12} \\ \tau_{I,J(I)} & . & \tau^N_{I,J(I)} & \tau_{I,J+(I)}\lambda_{I,J(I)} & . & \tau^N_{I,J+(I)}\lambda^M_{I,J(I)} \end{bmatrix}$$

zenith (polynomial) delay ionospheric measurement sensitivity matrix or,
(The following matrix is so wide it is split into six sections.)

$$\begin{bmatrix}
1 & \cos(2\lambda_{11}) & \cos(4\lambda_{11}) & \ldots & \cos(2M\lambda_{11}) & \sin(2\lambda_{11}) & \sin(4\lambda_{11}) & \ldots \\
1 & \cos(2\lambda_{12}) & \cos(4\lambda_{12}) & \ldots & \cos(2M\lambda_{12}) & \sin(2\lambda_{12}) & \sin(2\lambda_{12}) & \ldots \\
\ldots & \ldots & \ldots & \ldots & \ldots & \ldots & \ldots & \ldots \\
1 & \cos(2\lambda_{I,J(I)}) & \cos(4\lambda_{I,J(I)}) & \ldots & \cos(2M\lambda_{I,J(I)}) & \sin(2\lambda_{I,J(I)}) & \sin(4\lambda_{I,J(I)}) & \ldots
\end{bmatrix}$$

$$\begin{array}{cccccccc}
\sin(2M\lambda_{11}) & \cos(\tau_{11}) & \cos(2\tau_{11}) & \ldots & \cos(N\tau_{11}) & \sin(\tau_{11}) & \sin(2\tau_{11}) \\
\sin(2M\lambda_{12}) & \cos(\tau_{12}) & \cos(2\tau_{12}) & \ldots & \cos(N\tau_{12}) & \sin(\tau_{12}) & \sin(2\tau_{12}) \\
\ldots & \ldots & \ldots & \ldots & \ldots & \ldots & \ldots \\
\sin(2M\lambda_{I,J(I)}) & \cos(\tau_{I,J(I)}) & \cos(2\tau_{I,J(I)}) & \ldots & \cos(N\tau_{I,J(I)}) & \sin(\tau_{I,J(I)}) & \sin(2\tau_{I,J(I)})
\end{array}$$

$$\begin{array}{cccccc}
\ldots & \sin(N\tau_{11}) & \cos(\tau_{11})\cos(2\lambda_{11}) & \cos(\tau_{11})\cos(4\lambda_{11}) & \ldots & \cos(N\tau_{11})\cos(2M\lambda_{11}) \\
\ldots & \sin(N\tau_{12}) & \cos(\tau_{12})\cos(2\lambda_{12}) & \cos(\tau_{12})\cos(4\lambda_{12}) & \ldots & \cos(N\tau_{12})\cos(2M\lambda_{12}) \\
\ldots & \ldots & \ldots & \ldots & \ldots & \ldots \\
\ldots & \sin(N\tau_{I,J(I)}) & \cos(\tau_{I,J(I)})\cos(2\lambda_{I,J(I)}) & \cos(\tau_{I,J(I)})\cos(4\lambda_{I,J(I)}) & \ldots & \cos(N\tau_{I,J(I)})\cos(2M\lambda_{I,J(I)})
\end{array}$$

$$\begin{array}{cccccc}
\cos(\tau_{11})\sin(2\lambda_{11}) & \cos(\tau_{11})\sin(4\lambda_{11}) & \ldots & \cos(N\tau_{11})\sin(2M\lambda_{11}) & \sin(\tau_{11})\cos(2\lambda_{11}) \\
\cos(\tau_{12})\sin(2\lambda_{12}) & \cos(\tau_{12})\sin(4\lambda_{12}) & \ldots & \cos(N\tau_{12})\sin(2M\lambda_{12}) & \sin(\tau_{12})\cos(2\lambda_{12}) \\
\ldots & \ldots & \ldots & \ldots & \ldots \\
\cos(\tau_{I,J(I)})\sin(2\lambda_{I,J(I)}) & \cos(\tau_{I,J(I)})\sin(4\lambda_{I,J(I)}) & \ldots & \cos(N\tau_{I,J(I)})\sin(2M\lambda_{I,J(I)}) & \sin(\tau_{I,J(I)})\cos(2\lambda_{I,J(I)})
\end{array}$$

$$\begin{array}{ccccc}
\sin(\tau_{11})\cos(4\lambda_{11}) & \ldots & \sin(N\tau_{11})\cos(2M\lambda_{11}) & \sin(\tau_{11})\sin(2\lambda_{11}) \\
\sin(\tau_{12})\cos(4\lambda_{12}) & \ldots & \sin(N\tau_{12})\cos(2M\lambda_{12}) & \sin(\tau_{12})\sin(2\lambda_{12}) \\
\ldots & \ldots & \ldots & \ldots \\
\sin(\tau_{I,J(I)})\cos(4\lambda_{I,J(I)}) & \ldots & \sin(N\tau_{I,J(I)})\cos(2M\lambda_{I,J(I)}) & \sin(\tau_{I,J(I)})\sin(2\lambda_{I,J(I)})
\end{array}$$

$$\left.\begin{array}{ccc}
\sin(\tau_{11})\sin(4\lambda_{11}) & \ldots & \sin(N\tau_{11})\sin(2M\lambda_{11}) \\
\sin(\tau_{12})\sin(4\lambda_{12}) & \ldots & \sin(N\tau_{12})\sin(2M\lambda_{12}) \\
\ldots & \ldots & \ldots \\
\sin(\tau_{I,J(I)})\sin(4\lambda_{I,J(I)}) & \ldots & \sin(N\tau_{I,J(I)})\sin(2M\lambda_{I,J(I)})
\end{array}\right]$$

The above is a zenith (Fourier series) delay ionospheric measurement sensitivity matrix.

The zenith delay measurement matrix is:

$$[H] = [C][S]$$

The ionospheric (polynomial) zenith delay coefficient estimator is either a:

$$a_z = \begin{vmatrix} a_{00} \\ a_{01} \\ \cdot \\ \cdot \\ a_{nm} \\ \cdot \\ \cdot \\ a_{NM} \end{vmatrix} = \{([H])^T([H])\}^{-1}([H])^T D_I$$

or an ionospheric (Fourier series) zenith delay coefficient estimator:

$$a_z = \begin{vmatrix} a_{00} \\ a_{01} \\ \cdot \\ \cdot \\ a_{0,2M} \\ a_{1,0} \\ \cdot \\ \cdot \\ a_{2N,0} \\ a_{11} \\ a_{12} \\ \cdot \\ \cdot \\ a_{nm} \\ \cdot \\ \cdot \\ a_{4N,4M} \end{vmatrix} = \{([H])^T([H])\}^{-1}([H])^T D_I$$

$$D_{IZ}(\tau,\lambda) = \sum_{n=0}^{N} \sum_{m=0}^{M} a_{nm} \tau^n \lambda^m \quad \text{ionospheric zenith (polynomial) delay estimate for } \tau \text{ and } \lambda$$

or $$D_{IZ}(\tau,\lambda) = a_{00} + \sum_{m=1}^{M} [a_{0m} \cos(2m\lambda) + a_{0M+m} \sin(2m\lambda)] +$$

$$\sum_{n=1}^{N} [a_{n0} \cos(n\tau) + a_{n+n,0} \sin(n\tau)] +$$

$$\sum_{n=1}^{N} \sum_{m=1}^{M} [a_{nm} \cos(n\tau)\cos(2m\lambda)]$$

$$a_{N+n,M+m} \cos(n\tau)\sin(2m\lambda) + a_{2N+n,2M+m} \sin(n\tau)\cos(2m\lambda) +$$

$$a_{3N+n,3M+m} \sin(n\tau)\sin(2m\lambda)].$$

The above is the ionospheric zenith (Fourier series) delay estimate for $\tau$ and $\lambda$.

PERFORM CONVERGENCE CHECK $\delta D_{ij} = (D_{IZ}(\tau_{ij}, \lambda_{ij}) B_{ij} - \Delta P_{IONOij})$ line-of-sight ionospheric delay residual $J = \sum_{i=1}^{I} J(i)$ total number of measurements collected by network at one epoch $\delta D_{mean} = \frac{1}{J} \sum_{i=1}^{I} \sum_{j=1}^{J(i)} \delta D_{ij}$ residual mean $\delta D_{rms} = \sqrt{\frac{1}{J} \sum_{i=1}^{I} \sum_{j=1}^{J(i)} (\delta D_{ij})^2}$ root-mean-square residual If $\{(\delta D_{mean} < C_{mean})$ and $(\delta D_{rms} < C_{rms})\}$, convergence test passed (exit ionospheric delay model).

IONOSPHERIC ALTITUDE VARIATION ESTIMATOR $$\delta D = \begin{vmatrix} \delta D_{11} \\ \delta D_{12} \\ \cdot \\ \cdot \\ \delta D_{i,j} \\ \cdot \\ \cdot \\ \delta D_{I,J(I)} \end{vmatrix} \text{ionospheric delay measurement residual vector}$$

$A_{ij} = (1 - C_{ij}) B_{ij}$ $$[A] = \begin{bmatrix} A_{11} & 0 & 0 & . & 0 & . & 0 \\ 0 & A_{12} & 0 & . & 0 & . & 0 \\ . & . & . & . & . & . & . \\ 0 & 0 & 0 & . & A_{ij} & . & 0 \\ . & . & . & . & . & . & 0 \\ 0 & 0 & 0 & . & 0 & . & A_{I,J(I)} \end{bmatrix} \text{scaling matrix}$$

ionospheric (polynomial) altitude sensitivity matrix:

$$[S]_h = \begin{bmatrix} 1 & \lambda_{11} & \ldots & \lambda^K_{11} & \ldots & \tau^L_{11}\tau_{11}\lambda_{11} & \ldots & \tau^L_{11}\lambda^K_{11} \\ & \lambda^2_{11} & & \tau_{11} & & & & \\ 1 & \lambda_{12} & \ldots & \lambda^K_{12} & \ldots & \tau^L_{12} & & \ldots & \tau^L_{12}\lambda^K_{12} \\ & \lambda^2_{12} & & \tau_{12} & & \tau_{12}\lambda_{12} & & \\ \ldots & \ldots & & & & & & \\ 1 & \lambda_{I,J(I)} & \ldots & \lambda^K_{I,J(I)} & \ldots & \tau^L_{I,J(I)} & & \ldots & \tau^L_{I,J(I)} \\ & \lambda^2_{I,J(I)} & & \tau_{I,J(I)} & & \tau_{I,J(I)}\lambda_{I,J(I)} & & \lambda^K_{I,J(I)} \end{bmatrix}$$

or (Matrix $[S]_h$ is so wide it is split into six sections.)

$[S]_h =$ $$\begin{bmatrix} 1 & \cos(2\lambda_{11}) & \cos(4\lambda_{11}) & \ldots & \cos(2K\lambda_{11}) & \sin(2\lambda_{11}) & \sin(4\lambda_{11}) & \ldots \\ 1 & \cos(2\lambda_{12}) & \cos(4\lambda_{12}) & \ldots & \cos(2K\lambda_{12}) & \sin(2\lambda_{12}) & \sin(4\lambda_{12}) & \ldots \\ \cdot & \cdot & \cdot & & \cdot & \cdot & \cdot & \\ 1 & \cos(2\lambda_{I,J(I)}) & \cos(4\lambda_{I,J(I)}) & \ldots & \cos(2K\lambda_{I,J(I)}) & \sin(2\lambda_{I,J(I)}) & \sin(4\lambda_{I,J(I)}) & \ldots \end{bmatrix}$$

$$\begin{matrix} \sin(2K\lambda_{11}) & \cos(\tau_{11}) & \cos(2\tau_{11}) & \ldots & \cos(L\tau_{11}) & \sin(\tau_{11}) & \sin(2\tau_{11}) \\ \sin(2K\lambda_{12}) & \cos(\tau_{12}) & \cos(2\tau_{12}) & \ldots & \cos(L\tau_{12}) & \sin(\tau_{12}) & \sin(2\tau_{12}) \\ \cdot & \cdot & \cdot & & \cdot & \cdot & \cdot \\ \sin(2K\lambda_{I,J(I)}) & \cos(\tau_{I,J(I)}) & \cos(2\tau_{I,J(I)}) & \ldots & \cos(L\tau_{I,J(I)}) & \sin(\tau_{I,J(I)}) & \sin(2\tau_{I,J(I)}) \end{matrix}$$

$$\begin{matrix} \ldots & \sin(L\tau_{11}) & \cos(\tau_{11})\cos(2\lambda_{11}) & \cos(\tau_{11})\cos(4\lambda_{11}) & \ldots \cos(L\tau_{11})\cos(2K\lambda_{11}) \\ \ldots & \sin(L\tau_{12}) & \cos(\tau_{12})\cos(2\lambda_{12}) & \cos(\tau_{12})\cos(4\lambda_{12}) & \ldots \cos(L\tau_{12})\cos(2K\lambda_{12}) \\ \cdot & \cdot & \cdot & \cdot & \cdot \\ \ldots & \sin(L\tau_{I,J(I)}) & \cos(\tau_{I,J(I)})\cos(2\lambda_{I,J(I)}) & \cos(\tau_{I,J(I)})\cos(4\lambda_{I,J(I)}) & \ldots \cos(L\tau_{I,J(I)})\cos(2K\lambda_{I,J(I)}) \end{matrix}$$

$$\begin{matrix} \cos(\tau_{11})\sin(2\lambda_{11}) & \cos(\tau_{11})\sin(4\lambda_{11}) & \ldots & \ldots\cos(L\tau_{11})\sin(2K\lambda_{11}) & \sin(\tau_{11})\cos(2\lambda_{11}) \\ \cos(\tau_{12})\sin(2\lambda_{12}) & \cos(\tau_{12})\sin(4\lambda_{12}) & \ldots & \ldots\cos(L\tau_{12})\sin(2K\lambda_{12}) & \sin(\tau_{12})\cos(2\lambda_{12}) \\ \cdot & \cdot & & \cdot & \cdot \\ \cos(\tau_{I,J(I)})\sin(2\lambda_{I,J(I)}) & \cos(\tau_{I,J(I)})\sin(4\lambda_{I,J(I)}) & \ldots & \ldots\cos(L\tau_{I,J(I)})\sin(2K\lambda_{I,J(I)}) & \sin(\tau_{I,J(I)})\cos(2\lambda_{I,J(I)}) \end{matrix}$$

$$\begin{matrix} \sin(\tau_{11})\cos(4\lambda_{11}) & \ldots & \sin(L\tau_{11})\cos(2K\lambda_{11}) & \ldots & \sin(\tau_{11})\sin(2\lambda_{11}) \\ \sin(\tau_{12})\cos(4\lambda_{12}) & \ldots & \sin(L\tau_{12})\cos(2K\lambda_{12}) & \ldots & \sin(\tau_{12})\sin(2\lambda_{12}) \\ \cdot & & \cdot & & \cdot \\ \sin(\tau_{I,J(I)})\cos(4\lambda_{I,J(I)}) & \ldots & \sin(L\tau_{I,J(I)})\cos(2K\lambda_{I,J(I)}) & \ldots & \sin(\tau_{I,J(I)})\sin(2\lambda_{I,J(I)}) \end{matrix}$$

$$\begin{matrix} \sin(\tau_{11})\sin(4\lambda_{11}) & \ldots & \sin(L\tau_{11})\sin(2K\lambda_{11}) \\ \sin(\tau_{12})\sin(4\lambda_{12}) & \ldots & \sin(L\tau_{12})\sin(2K\lambda_{12}) \\ \cdot & & \cdot \\ \sin(\tau_{I,J(I)})\sin(4\lambda_{I,J(I)}) & \ldots & \sin(L\tau_{I,J(I)})\sin(2K\lambda_{I,J(I)}) \end{matrix}$$

The above is an ionospheric (Fourier series) altitude sensitivity matrix.

$$[H]_b = [A][S]_h$$

ionospheric altitude measurement matrix, $$a_h = \begin{vmatrix} a_{h00} \\ a_{h01} \\ \cdot \\ \cdot \\ a_{h1k} \\ \cdot \\ \cdot \\ a_{hLK} \end{vmatrix} = \{([H]_h)^T([H]_h)\}^{-1}([H]_h)^T \delta D$$

ionospheric (polynomial) altitude variation coefficient estimator $$a_h = \begin{vmatrix} a_{h00} \\ a_{h01} \\ \cdot \\ \cdot \\ a_{h0,2K} \\ a_{h10} \\ \cdot \\ \cdot \\ a_{h2L,0} \\ a_{h11} \\ a_{h12} \\ \cdot \\ \cdot \\ a_{h1,k} \\ \cdot \\ \cdot \\ a_{h4L,4K} \end{vmatrix} = \{([H]_h)^T([H]_h)\}^{-1}([H]_h)^T \delta D$$

ionospheric (Fourier series) altitude variation coefficient estimator. Return to ionospheric zenith delay estimator.

TABLE 8C

GLOBAL IONOSPHERIC DELAY MODEL OUTPUTS

| | | |
|---|---|---|
| $a_z$ | = | zenith ionospheric delay model coefficient vector |
| $a_h$ | = | ionospheric altitude variation model coefficient vector |
| $\delta D_{mean}$, $\delta D_{rms}$ | = | ionospheric model mean and rms residuals |

The ionospheric model estimator 116 is driven by dual-frequency GPS reference receiver (30 or 32) measurements of the observed absolute ionospheric delays. The estimator is a global model, although a user algorithm may be based on a local subset, or truncated version, of the global model. Because of the time varying nature of the ionosphere (the reasons for which are not well understood), the model is updated hourly. Although it is desirable to have the model be as accurate as possible, the global extent of the model with a reasonable number of coefficients and the updating these coefficients only once an hour will probably limit the accuracy to 80–90% of the ionospheric delay. Also, the need to minimize communication costs and realize a computationally simple user algorithm will further limit the accuracy at the user end.

IONOSPHERIC FILTER STABILITY CHECKS

The specific form of the filter stability checks required for ionospheric model estimator 116 will depend on the estimator. The stability checks are based on checking the estimator residuals for whiteness or any significant biases.

SYSTEM STATUS AND CONTROL FUNCTION SOFTWARE

Since reference stations 12 are in remote locations relative to CPF 16, they are unmanned, and it is desirable to have the capability to command the two reference receivers in each reference station 12. The data from the two reference receivers is compared by failure detection and isolation software 88 at reference station 12. With one of the receivers (30 and 32) designated as primary and the second as backup, the designations can be switched if it is determined that the data from the primary receiver is suspect. The quality control can be done by failure detection and isolation software 88. The authority to switch from the primary to the backup receiver 32 is handled automatically at reference station 12, with a manual over-ride capability from CPF 16. Alternately, the authority is fully assigned to reference station 12 or to CPF 16.

CENTRAL PROCESSOR

The choice of an operational central processor 16 requirement is strongly influenced by the code requirements of SV 14 orbit estimator 104, SV clock estimator 106 and the ionospheric model estimator 116. Most likely a work station environment is required, since a PC environment will not be adequate.

For an operational central processor 69, a number of different options can be considered. The output display requirements for the operational central processor 69 are dictated by the need for operator control and monitoring of the various software modules as well as the capability to provide WWDGPS network situation and status displays. These dual requirements could be satisfied with a single large screen monitor with windowing capability to display both network status as well as central processing status. Alternately, an operator console consisting of a standard monitor and a separate large screen display to present the network status could be employed.

BROADCAST COMMUNICATIONS SYSTEM FUNCTIONS

The principal function of datalink 20 is to transmit SV 14 clock and ephemeris corrections and the network ionospheric model corrections to users 22 and can include companies that sell differential corrections to their customers or end-users of these corrections.

The corrections must be broadcast in near real-time and some of the corrections need to be sent out more frequently, to minimize data latency. A two-sigma error growth occurs because of selective availability as a function of the delay in getting the corrections to user 22, assuming the corrections are perfect. For a thirty second delay, nearly five meters ($2\sigma$) error may be introduced by SA clock dither. In order to minimize the cost of using datalink 20, the corrections must be packaged efficiently.

BROADCAST COMMUNICATIONS SYSTEM DATA FLOW REQUIREMENTS

The section discusses the data flow requirements for datalink 20 by presenting the message definition and the transmission requirements. The broadcast message is separated into two integrity messages, a primary integrity data and a navigation message validation. It also includes three correction messages: a ephemeris correction data, a clock correction and a ionospheric correction data.

The primary integrity data specifies the integrity of all the satellites. The navigation message validation, in turn, specifies the integrity of the navigation message. The ephemeris correction data includes in addition to the ephemeris corrections, estimated by SV 14 orbit estimator 104, the time of the message, the issue of data ephemeris (IODE), and SV ID. The clock correction data includes in addition to SV 14 clock corrections, the time of the message, SV 14 id and SV 14 signal quality or signal strength. because of its importance, the primary integrity data is broadcast at one Hz. because of the SA dither on SV 14 clock, the clock corrections should be broadcast at a 0.1 Hz frequency to user 22.

While the ionospheric correction frequencies depend in part on the ionospheric model estimator 116, these probably are comparable to the frequencies required for correcting SV 14 orbit errors. The civilian message transmission requirement is under 160 bps. conservatively, it is estimated that data rates of 300 bps should be adequate for all the data, excluding the ionospheric data. The ionospheric data can require an additional 300 bps for a total of 600 bps.

BROADCAST COMMUNICATIONS HARDWARE REQUIREMENTS

It is anticipated that datalink 20 will have two levels. The first level uses communications satellites and the data is broadcast using global or hemispherical beams. The level will cover the entire globe from about 70° south to 70° north latitude. The second level uses local area communications. There are two systems that can be used for the first level.

The first is INMARSAT COMSAT. which is satellite system that has a data service using small, inexpensive terminals and omnidirectional antennas. The service is intended for two-way communication but can be used in the broadcast mode. It has the capability to broadcast data to users 22 at 600 bps.

The second service, the INTELSAT INTELNET service, has two modes. One is a point-to-point service and the other is a point-to-multipoint service. As previously discussed, the communication system uses the point-to-point service. The point-to-multipoint service, as normally configured, requires the use of small directional antennas. However, changes are made to the system so that only an omnidirectional antenna is required and allows the system to still meet the 600 bps data rate requirement.

The second level of datalink 20 is exemplified by use of a subcarrier from an FM broadcast station. The subcarrier broadcast could transmit the data to just a local area and users 22 would require a communication receiver (FM radio) much less expensive than that required (satellite receiver) by users of the first level of datalink 20.

REDUCING DATA COMMUNICATIONS VOLUMES

The broadcast ephemeris parameter information being sent to users 22 by CPF 16 is preferably done at a rate not so frequent that the broadcast communication datalink 20 becomes congested, about ten minutes is the minimum period. However, the rate must not be so infrequent that it is impossible to obtain a reasonable set of ephemeris parameters that will retain their accuracy. Two hundred minutes is the limit.

Data communications volume and bandwidth in a networked differential GPS system can be reduced by deriving ionospheric correction data (PRCs) in relation to a master reference position $x^{ref1}$ obtained from a plurality of fixed location reference stations. Interpolating said PRCs to produce ionospheric correction data for a plurality of user positions $s^{user}$ amongst said reference stations. Communicating partials of said PRCs to said users wherein each user can adjust received differential corrections for its own location by applying a simple linear function using measured gradients as coefficients to difference between user position $x^{user}$ and master reference position $x^{ref1}$:

$\partial PRC/\partial N$ = gradient of PRC in northerly direction, $\partial PRC/\partial E$ = gradient of PRC in easterly direction, and $PRC^{user} = PRC^{ref} + (\partial PRC/\partial N, \partial PRC/\partial E, 0)\cdot(x^{user} - x^{ref1})$.

INTERPOLATED CORRECTIONS FOR USERS

Three or more reference stations 12 are used to find averaged corrections for arbitrary points around the world that lie amongst reference stations 12. These points produce what appears to be a plurality of phantom reference stations to the users 22. Corrections that are sent to users 22 are normalized (referenced to) to the nearest phantom reference position, in two-dimensions, East-West and north-south. Unlike the prior art, the accuracy of corrections provided to users 22 is not a function of individual separation distances of a user 22 from a particular reference station 12 or a phantom reference station. Each reference station 12 contributes to a blend of weighted averages that have a consistent accuracy at substantially all points on the globe. The two-dimensional partials with respect to the phantom reference station points are compensated (fudged) to ease the computational load on users 22 and result in a high quality correction. Users 22 are not uniform in their position solution accuracy needs, so those users that do not require extreme accuracy are sent shorter (less bit precision) messages. Less precise messages are less expensive to produce because the computational loads can be scaled back in real-time and accordingly subscription prices could be reduced.

RAPID SATELLITE ORBIT EPHEMERIDES PARAMETER DETERMINATION

Above, the orbit ephemeris parameter estimator relies on a history of SV positions collected over several epochs. Using SV carrier measurements that have been corrected for ionospheric and tropospheric effects, SV velocity can be obtained directly. A rapid GPS network SV orbit ephemeris parameter estimator that receives both SV position and velocity such that an immediate Kepler is available is comprised of means for obtaining measurements from a plurality of reference stations comprising carrier-smoothed pseudoranges that have been corrected for both ionospheric and tropospheric delays and that produces an ionospheric delay measurement. Such a means is reference station 12 (FIG. 1). A central processing facility, such as CPF 16, is used for computing SV positions from said reference station measurements. A carrier correction means for correcting an SV carrier for both ionospheric and tropospheric delays is needed at each reference station 12. This provides a precise measurement of corresponding SV velocity that is communicated to CPF 16. Included are estimating means for generating a set of SV orbit ephemeris parameters which processes all of said reference station measurements through one of a least-squares estimator or Kalman filter, such as has been described above for CPF 16. A set of SV orbit ephemeris parameters is then broadcast to users 22. The accuracy of navigation of each user 22 is substantially improved thereby.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An ionospheric delay modeling method, the comprising the steps of:
   obtaining both code and carrier measurements from a dual-frequency GPS receiver of ionospheric delays in a sparse network of reference station receivers tracking SV's in the GPS constellation;
   using a two-dimensional geomagnetic latitude and local time Taylor Series or Fourier Series to map equivalent local zenith measurements into an ionospheric delay global model; and
   using a two-step iterated least-squares estimator that estimates zenith coefficients for assumed ionosphere altitude, which checks the goodness-of-fit and examines residuals, which estimates ionosphere altitude for assumed zenith coefficients and that repeats the foregoing steps when required to achieve convergence.

2. The method of claim 1, further comprising the subsequent step of:
   truncating estimates to obtain a regional model from said ionospheric delay global model.

3. The method of claim 1, further comprising the subsequent step of:
   local-fitting to obtain a regional model from said ionospheric delay global model.

4. A differential GPS (DGPS) system for providing GPS correction information to a plurality of users according to each user's position, comprising:
   a regional network of a plurality of reference stations for tracking a plurality of satellites (SV's) in the GPS constellation of satellites wherein at least five reference stations track each SV with unauthorized GPS receivers;
   a central processing facility (CPF) in communication with the regional network of reference stations and having means for computing satellite orbit and clock errors and self-synchronizing clock means for deriving a DGPS system clock from a plurality of said unauthorized GPS receivers; and
   communication means connected to the CPF for obtaining reference station measurements and for distributing DGPS corrections to users, wherein the use of complex ionospheric and tropospheric delay models are avoided and authorized GPS receivers are unnecessary.

5. The system of claim 4, further comprising:
   ionospheric delays computing means connected to the CPF for computing ionospheric delays for single-frequency users; and
   ionospheric message broadcasting means connected to the CPF for broadcasting to particular users separate ionospheric messages.

6. The system of claim 5, wherein
   said ionospheric messages comprise near real-time estimate of parameters tuned to particular regions of the earth.

7. The system of claim 4, wherein:
   each of the plurality of reference stations have at least one GPS receiver for estimating ionospheric delays which are communicated to the CPF for determination of the ionospheric delays in a region of the earth by interpolation of a plurality of GPS signals received by all of said GPS receivers.

8. The system of claim 4, further comprising:
   group processing means connected to the CPF for reducing communications costs at the reference stations having means for separation of the reference stations into groups, each group having means for independently measuring satellite positions and clocks; and
   group control center connected to the CPF for inputting collective estimates for SV orbits such that a reduction in communications and data rates are realized.

9. The system of claim 8, wherein:
   each group control center has an atomic clock for providing time synchronization between the groups of reference stations.

10. The system of claim 8, wherein:
    each group control center comprises means for quality control and robustness improvement based on atomic clocks.

11. The system of claim 4, wherein:
    the plurality of reference stations is limited in number by a predetermined minimum number of reference stations needed to keep all SV's in said GPS constellation of satellites in view by at least one reference station at any one time wherein re-initializations of any particular SV are avoided.

12. The system of claim 4, further comprising:
    broadcast communication means connected to the CPF for sending to users DGPS corrections with differing accuracy levels with an identical message.

13. The system of claim 4, wherein the CPF further comprises:
    measurement collection means for obtaining both code and carrier measurements from a dual-frequency GPS receiver of ionospheric delays over a period not longer than the period an individual SV is in view from a single reference station in a sparse network of reference station receivers tracking SV's in the GPS constellation;
    measurement preprocessing means for preprocessing measurements to remove tropospheric and measured ionospheric signal delays;

ephemeris estimating means for estimating SV orbit ephemeris parameters using one of a least-squares estimator and Kalman filter; and ephemeris broadcasting means for broadcasting SV orbit ephemeris information to a plurality of users.

14. The system of claim 13, wherein the means for broadcasting ephemeris information to users comprises:

ephemeris information transmission means for sending said ephemeris information at a rate not exceeding once every ten minutes and not less than once every two hundred minutes.

15. The system of claim 13, wherein the measurement collection means comprises one of: a P-code GPS receiver, a cross-correlation codeless GPS receiver, or a combination P-code and cross-correlation codeless GPS receiver.

16. The system of claim 13, wherein said SV orbit ephemeris information sent by the ephemeris broadcasting means comprises:

a complete set of SV orbit parameters.

17. The system of claim 13, wherein said SV orbit ephemeris information sent by the ephemeris broadcasting means comprises corrections to an SV orbit parameter set that has been downlinked by an individual SV.

18. The system of claim 13, wherein the ephemeris estimating means comprises:

orbit position estimating means for estimating a set of all SV orbit positions in aggregate at each epoch from said preprocessed measurements using a least squares estimator, wherein one estimator is used for all SV's; and orbit parameter estimating means for estimating SV orbit parameters for each SV from an accumulated history of positions for each SV using at least one of a least squares estimator and a Kalman filter, wherein a single estimator is used for each SV.

19. The system of claim 18, wherein the means for estimating a set of all SV orbit positions comprises:

clock error removal means for removing SV and reference station clock errors using a linear transformation of the preprocessed measurements; and SV position estimating means for estimating SV positions from the transformed measurements using a least squares estimator.

20. The system of claim 13, further comprising:

means for removing SV and reference site clock errors using an orthogonal transformation;

means for estimating SV orbit position errors for all SV's at one epoch using a least-squares estimator;

means for repeating said preprocessing, removing and estimating every few minutes until sufficient measurement estimates have been obtained; and means for propagating all position estimates for one SV to a common epoch.

21. The system of claim 13, wherein said CPF further comprises:

means for using carrier-smooth pseudoranges that have been tropospherically and ionospherically corrected as inputs to construct a measurement vector $Y_k$ that contains all of a plurality of pseudoranges at one epoch from a plurality of reference stations.

22. A dual-frequency differential GPS network (DGPS), comprising:

a plurality of reference stations not exceeding thirty-three in number substantially equally distributed around the earth at locations on land for continuous tracking of every one of the satellites in the GPS constellation by at least one of the reference stations at any one time;

a central processing facility (CPF) in communication with all of the reference stations;

a plurality of dual-frequency non-authorized GPS receivers wherein at least one each is located at each of the reference stations and provide measurements of signals from various GPS satellites for the computation of ionospheric delays in the local area of the respective reference station; and computing means in communication with the plurality of reference stations for estimating global ionospheric delays for a plurality of user locations and for computing satellite orbit and clock corrections without authorized precision code access.

23. The DGPS of claim 22, further comprising:

communication means connected to the computing means for supplying interpolated ionospheric delays and satellite orbit corrections to particular users in relation to the locations of said users.

24. A method of reducing data communications volume and bandwidth in a networked differential GPS system comprising a plurality of reference stations, a central processing facility (CPF) and group control centers, the method comprising the steps of:

estimating GPS satellite orbit ephemerides in four-dimensions and in real-time at a CPF or a group control center;

communicating GPS satellite clock corrections derived from the step of estimating at a first update rate from the CPF or group control centers to a plurality of users; and communicating GPS satellite orbit corrections derived from the step of estimating at a second update rate from the CPF or group control centers to a plurality of users, said second update rate being substantially slower than said first update rate.

25. A method of producing real-time GPS satellite corrections in a networked differential GPS system, the method comprising the steps of:

receiving a plurality of GPS position signals with a plurality of codeless GPS receivers distributed amongst a plurality of reference stations;

processing said GPS position signals with a GPS navigation processor to determine orbit position and orbit ephemerides for at least one orbiting GPS satellite;

estimating GPS satellite orbit position errors and their orbit ephemerides from said GPS positions signals with a least squares estimator; and estimating GPS satellite clock errors from said GPS position signals with a least-squares estimator.

26. A method of estimating GPS satellite orbit parameters to produce stable estimates that stay fresh for at least ten minutes, the method comprising the steps of:

receiving a plurality of GPS position signals with a GPS receiver;

processing said GPS position signals with a GPS navigation processor to determine orbit position and orbit ephemerides for at least one orbiting GPS satellite;

initializing an epoch counter;

estimating the XYZ orbit position of a plurality of GPS satellites received by said GPS receiver at one epoch;

repeating the estimating of the XYZ orbit position for at least ten minutes; and feeding said orbit position estimates gathered over an epoch to an orbit relaxation estimator which estimates at least fifteen orbit parameter corrections each thirty to sixty minutes.

27. A rapid GPS network space vehicle (SV) orbit ephemeris parameter estimator that receives both SV position and velocity such that an immediate Kepler is available, comprising:

means for obtaining measurements from a plurality of reference stations comprising carrier-smoothed pseudoranges that have been corrected for both ionospheric and tropospheric delays and that produces an ionospheric delay measurement;

a central processing facility for computing SV positions from said reference station measurements;

carrier correction means for correcting an SV carrier for both ionospheric and tropospheric delays at each reference station thereby providing a precise measurement of corresponding SV velocity;

estimating means for generating a set of SV orbit ephemeris parameters which process all of said reference station measurements through one of a least-squares estimator or Kalman filter; and means for broadcasting said set of SV orbit ephemeris parameters to a plurality of users such that user navigation is substantially improved thereby.

28. A differential GPS system, comprising:

a plurality of reference stations at separate locations and each having a codeless dual-frequency GPS receiver for obtaining ionospheric and tropospheric delay measurements at more than one of said reference stations from a single GPS satellite;

a central processing facility in communication with the plurality of reference stations and having means for synthesizing clock error signals from non-precision code measurements communicated from said codeless dual-frequency GPS receivers.

29. A GPS network space vehicle (SV) orbit ephemeris estimator, comprising:

means for obtaining both code and carrier measurements from a dual-frequency GPS receiver of ionospheric delays over a period not longer than the period an individual SV is in view from a single reference station in a sparse network of reference station receivers tracking SV's in the GPS constellation, wherein each reference station comprises means for ionospheric processing with a codeless L2 receiver to use night-time measurements that represent stable initial estimates of ionosphere and for using ionospheric rates from L2 to get estimates of ionospheric delays at zenith;

means for preprocessing measurements to remove tropospheric and measured ionospheric signal delays;

means for estimating SV orbit ephemeris parameters using one of a least-squares estimator and Kalman filter; and means for broadcasting SV orbit ephemeris information to a plurality of users.

means for estimating SV orbit ephemeris parameters using one of a least-squares estimator and Kalman filter; and means for broadcasting SV orbit ephemeris information to a plurality of users.

30. A differential GPS (DGPS) system that provides GPS correction information to a plurality of users according to each user's position, comprising:

a global network of a plurality of reference stations for tracking a plurality of satellites (SV's) in the GPS constellation of satellites wherein at least five reference stations track each SV;

a central processing facility (CPF) having means for computing satellite orbit and clock errors, comprising:

means for using carrier-smoothed pseudoranges that have been tropospherically and ionospherically corrected as inputs to construct a measurement vector $Y_k$ that contains all of a plurality of pseudoranges at one epoch from a plurality of reference stations;

means for selecting a linear transformation matrix, $[D_{OR}]$, in which the product of the matrix and a measurement matrix $[B]$ of partials of pseudorange errors with respect to reference receiver clock errors, is zero: $[D_{OR}][B]=0$, said linear transformation being used to eliminate unwanted reference receiver clock errors in $Y_k$ which leads to a corrected measurement vector $y_k$; and a least-squares estimator for computing SV position errors $x_k$ for all SV's at one epoch from $y_k$; and communication means connected to the CPF for obtaining reference station measurements and for distributing DGPS corrections to users.

31. A differential GPS (DGPS) system that provides GPS correction information to a plurality of users according to each user's position, comprising:

a global network of a plurality of reference stations for tracking a plurality of satellites (SV's) in the GPS constellation of satellites wherein at least five reference stations track each SV;

a central processing facility (CPF) having means for computing satellite orbit and clock errors; and communication means connected to the CPF for obtaining reference station measurements and for distributing DGPS corrections to users;

wherein each of the plurality of reference stations include means for using measurements from the SV's to estimate a zenith component of ionospheric delay at each reference station; and the CPF comprises means to combine said zenith components to calibrate a model of ionospheric delay as a function of time and comprises means to distribute said model to a plurality of single-frequency users.

32. The system of claim 31, wherein:

said zenith component estimating means comprises a least-squares estimator.

33. A differential GPS (DGPS) system that provides GPS correction information to a plurality of users according to each user's position, comprising:

a global network of a plurality of reference stations for tracking a plurality of satellites (SV's) in the GPS constellation of satellites wherein at least five reference stations track each SV;

a central processing facility (CPF) having means for computing satellite orbit and clock errors; and communication means connected to the CPF for obtaining reference station measurements and for distributing DGPS corrections to users;

wherein each reference station comprises means for the measurement of slant ranges that are mapped to reference station coordinates.

34. A differential GPS (DGPS) system that provides GPS correction information to a plurality of users according to each user's position comprising:
- a global network of a plurality of reference stations for tracking a plurality of satellites (SV's) in the GPS constellation of satellites wherein at least five reference stations track each SV;
- a central processing facility (CPF) having means for computing satellite orbit and clock errors; and
- communication means connected to the CPF for obtaining reference station measurements and for distributing DGPS corrections to users;
- wherein the CPF comprises means for generating quality control information by using over-specified reference station information and applying a root-sum-of-squares algorithm.

35. A differential GPS (DGPS) system that provides GPS correction information to a plurality of users according to each user's position, comprising:
- a global network of a plurality of reference stations for tracking a plurality of satellites (SV's) in the GPS constellation of satellites wherein at least five reference stations track each SV;
- a central processing facility (CPF) having means for computing satellite orbit and clock errors; and
- communication means connected to the CPF for obtaining reference station measurements and for distributing DGPS corrections to users;
- wherein the CPF comprises means for building SV orbits generating real-time ephemerides in a two step least-squares estimator which estimates the XYZ position of SV's and then estimates their orbital ephemeris terms.

* * * * *